(12) United States Patent
Carlson

(10) Patent No.: US 12,076,909 B2
(45) Date of Patent: Sep. 3, 2024

(54) HELICALLY WOUND TUBING WITH EXPOSED CONDUCTORS

(71) Applicant: STEWARD PLASTICS, INC., Laguna Hills, CA (US)

(72) Inventor: Eric Carlson, Newport Beach, CA (US)

(73) Assignee: Steward Plastics, Inc., Laguna Hills, CA (US)

( * ) Notice: Subject to any disclaimer, the term of this patent is extended or adjusted under 35 U.S.C. 154(b) by 0 days.

(21) Appl. No.: 17/724,380

(22) Filed: Apr. 19, 2022

(65) Prior Publication Data

US 2022/0339854 A1  Oct. 27, 2022

Related U.S. Application Data

(60) Provisional application No. 63/177,585, filed on Apr. 21, 2021.

(51) Int. Cl.

| | |
|---|---|
| *F16L 11/00* | (2006.01) |
| *B29C 53/58* | (2006.01) |
| *F16L 11/08* | (2006.01) |
| *F16L 11/127* | (2006.01) |
| *F16L 11/16* | (2006.01) |

(52) U.S. Cl.
CPC .......... *B29C 53/582* (2013.01); *F16L 11/081* (2013.01); *F16L 11/127* (2013.01); *F16L 11/16* (2013.01)

(58) Field of Classification Search
CPC ......... F16L 11/081; F16L 11/127; F16L 11/16
USPC ................................. 138/122, 129, 132, 133
See application file for complete search history.

(56) References Cited

U.S. PATENT DOCUMENTS

| | | | | |
|---|---|---|---|---|
| 2,707,490 | A | * | 5/1955 | Harris .................... B29D 23/18 138/133 |
| 3,866,632 | A | | 2/1975 | Schaffer |
| 3,938,929 | A | * | 2/1976 | Stent .................... B29C 53/827 425/363 |

(Continued)

FOREIGN PATENT DOCUMENTS

| | | |
|---|---|---|
| EP | 0252338 A1 | 1/1988 |
| JP | 08-182146 | 7/1996 |
| JP | 2001-280556 | 10/2011 |

OTHER PUBLICATIONS

International Search Report and Written Opinion (dated Jul. 27, 2022) for Corresponding PCT Patent Application PCT/US2022/025410, filed Apr. 19, 2022.

(Continued)

*Primary Examiner* — Patrick F Brinson
(74) *Attorney, Agent, or Firm* — Snell & Wilmer LLP

(57) ABSTRACT

Tubing comprising a tubing wall formed of an elongate thermoplastic ribbon helically wrapped and heat bonded to itself to form the tubing wall. The tubing may include one or more elongate conductors helically wrapped around and along the tubing wall. The tubing may include an elongate reinforcement rib helically wrapped around and along the tubing wall such that the tubing wall includes a first portion in which the elongate reinforcement rib covers the one or more elongate conductors and a second portion in which the one or more elongate conductors are uncovered by the elongate reinforcement rib and the elongate reinforcement rib wraps around the tubing wall.

20 Claims, 14 Drawing Sheets

(56) References Cited

U.S. PATENT DOCUMENTS

| | | | | |
|---|---|---|---|---|
| 4,203,476 | A * | 5/1980 | Vitellaro | F16L 11/24 |
| | | | | 156/170 |
| 4,204,562 | A * | 5/1980 | Kelly | F16L 11/112 |
| | | | | 138/132 |
| 4,368,088 | A * | 1/1983 | Asakura | F16L 11/16 |
| | | | | 156/143 |
| 4,484,586 | A | 11/1984 | McMickle et al. | |
| 4,686,354 | A | 8/1987 | Makin | |
| 5,454,061 | A | 9/1995 | Carlson | |
| 6,907,906 | B1 * | 6/2005 | Cook | F16L 11/115 |
| | | | | 138/144 |
| 7,120,354 | B2 | 10/2006 | Mackie et al. | |
| 7,965,930 | B2 * | 6/2011 | Carlson | F16L 11/127 |
| | | | | 137/341 |
| 8,726,901 | B2 | 5/2014 | Jassell et al. | |
| 9,077,134 | B2 | 7/2015 | Ferrone | |
| 9,327,093 | B2 | 5/2016 | Klasek et al. | |
| 9,625,066 | B2 * | 4/2017 | Carlson | A61M 39/08 |
| 2008/0011413 | A1 | 1/2008 | Smith et al. | |
| 2009/0078440 | A1 | 3/2009 | Carlson et al. | |
| 2010/0139661 | A1 | 6/2010 | Landis | |
| 2011/0192624 | A1 * | 8/2011 | Carlson | F16L 11/16 |
| | | | | 174/34 |
| 2014/0000626 | A1 | 1/2014 | O'Connor et al. | |
| 2015/0306333 | A1 | 10/2015 | Amadio et al. | |
| 2017/0100556 | A1 | 4/2017 | Munkelt et al. | |
| 2018/0214659 | A1 | 8/2018 | Forrester | |

OTHER PUBLICATIONS

International Preliminary Report on Patentability (dated Oct. 24, 2023) and Written Opinion (mailing date Jul. 27, 2022) for Corresponding PCT Patent Application PCT/US2022/025410, filed Apr. 19, 2022.

* cited by examiner

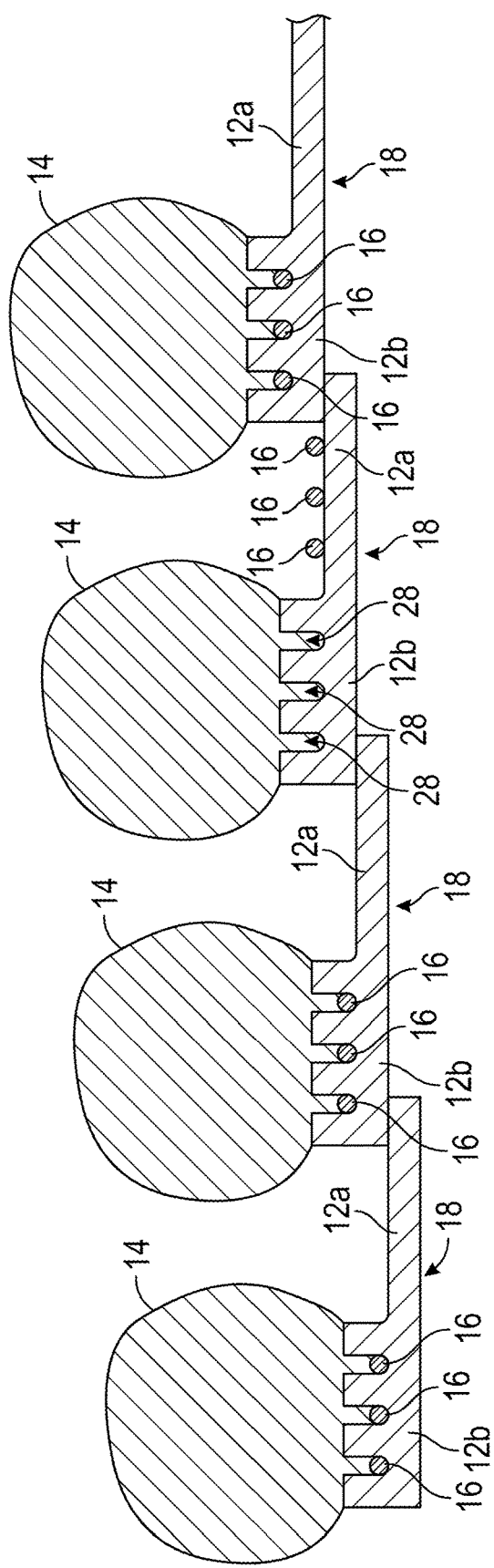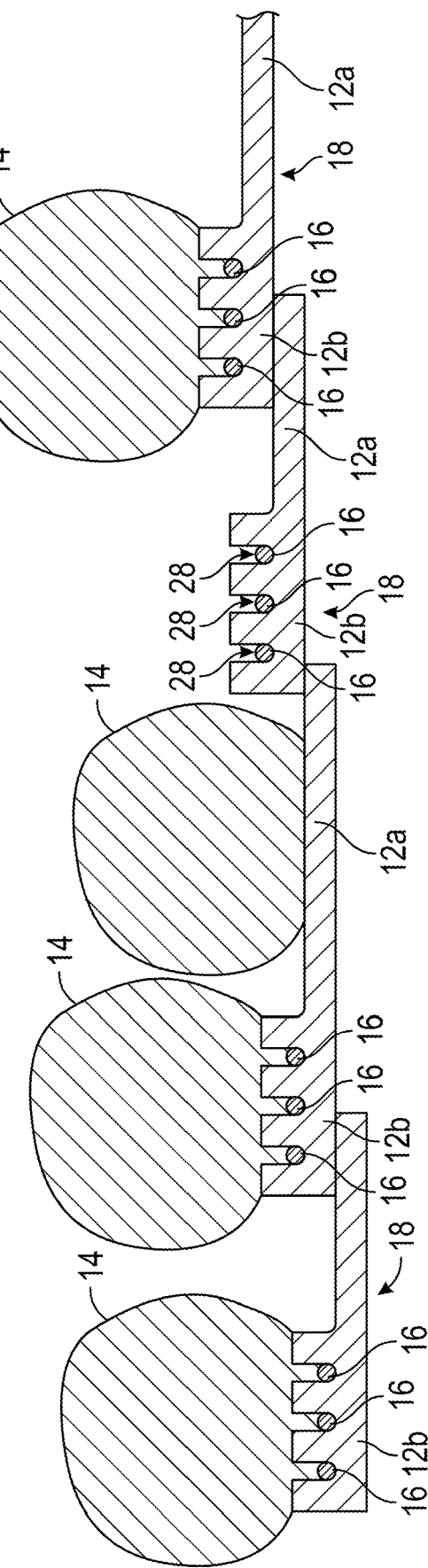

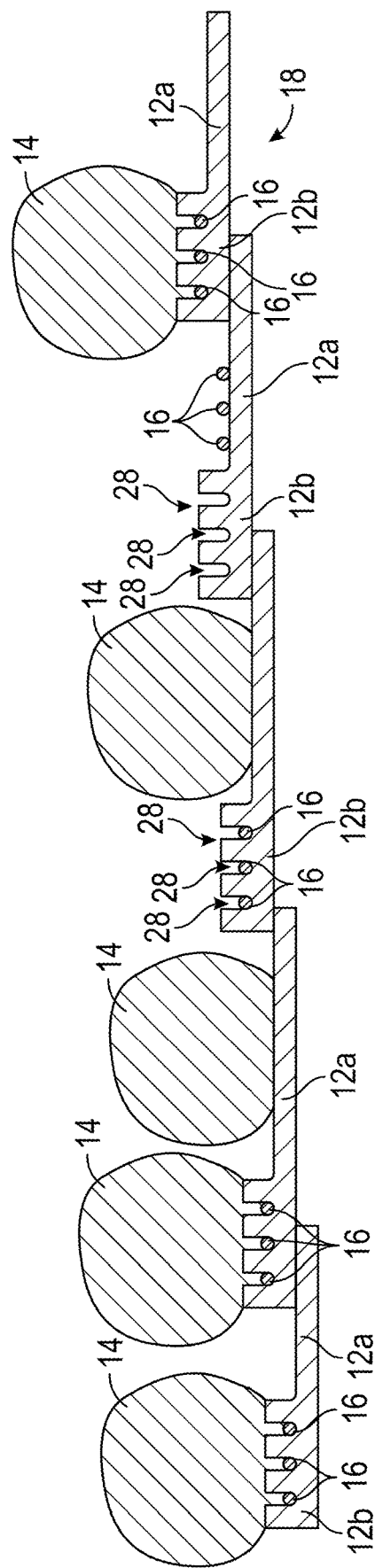

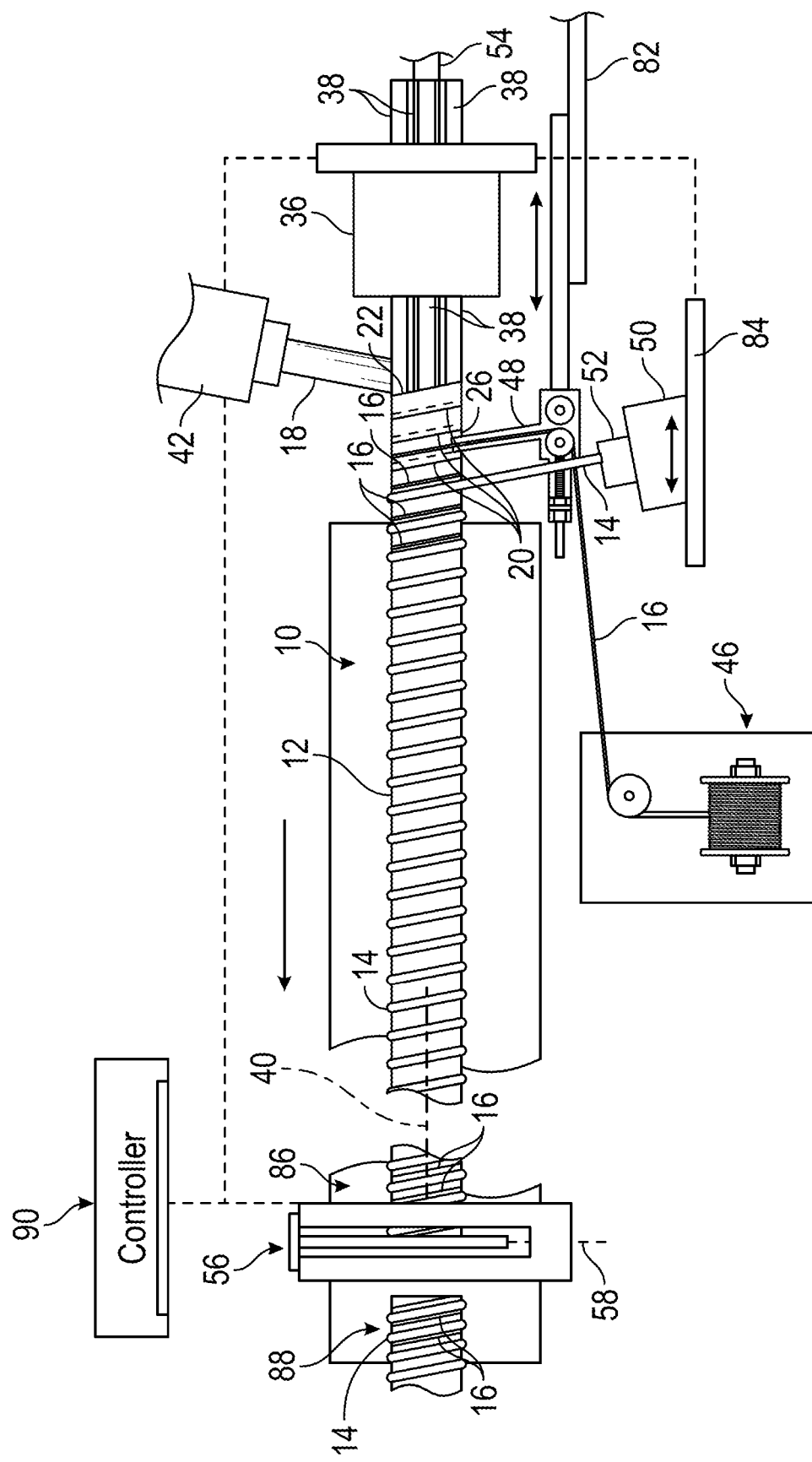

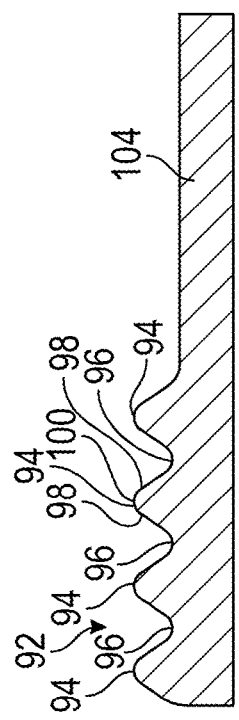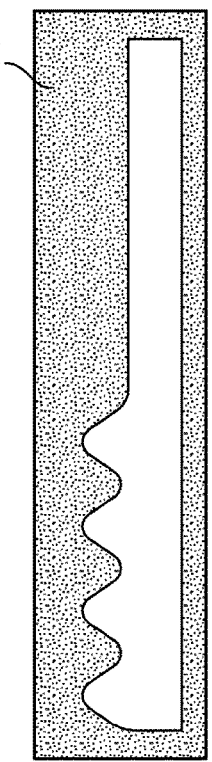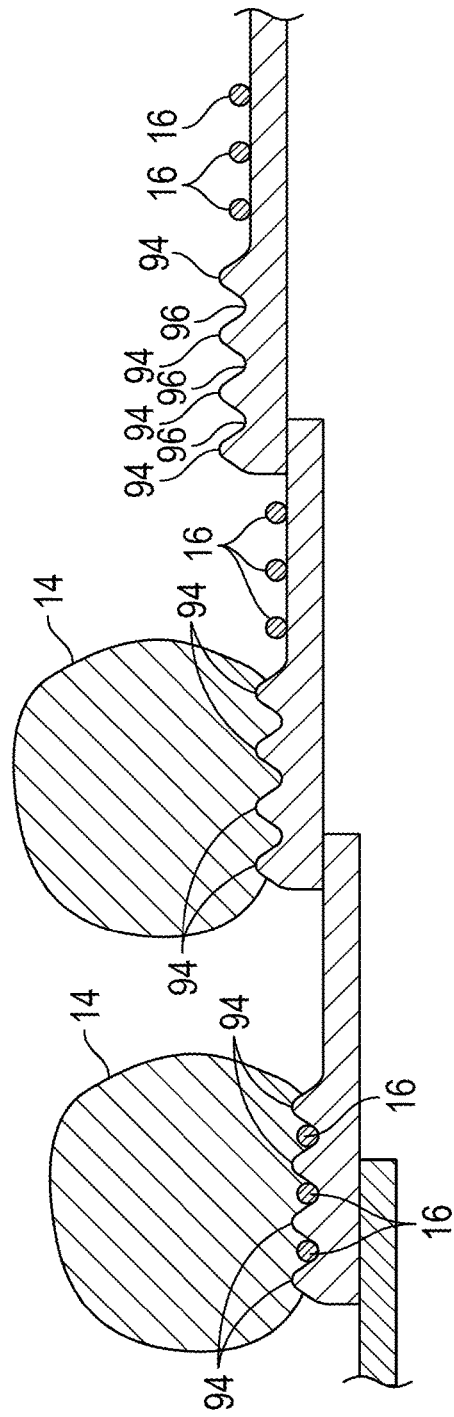

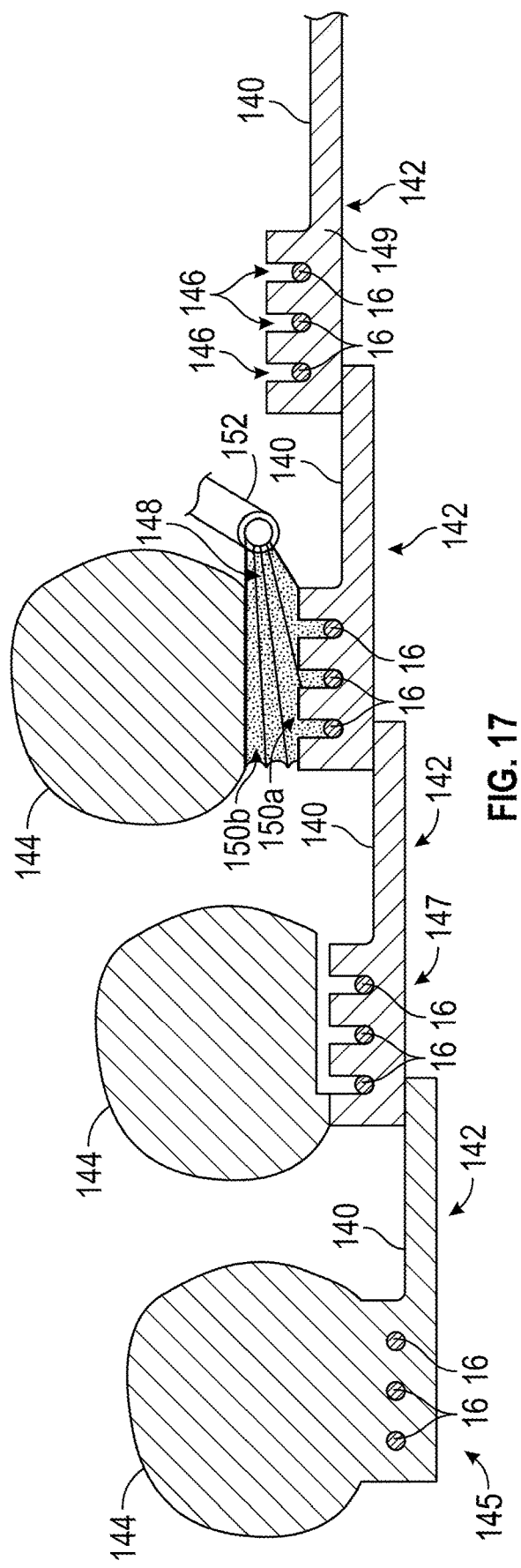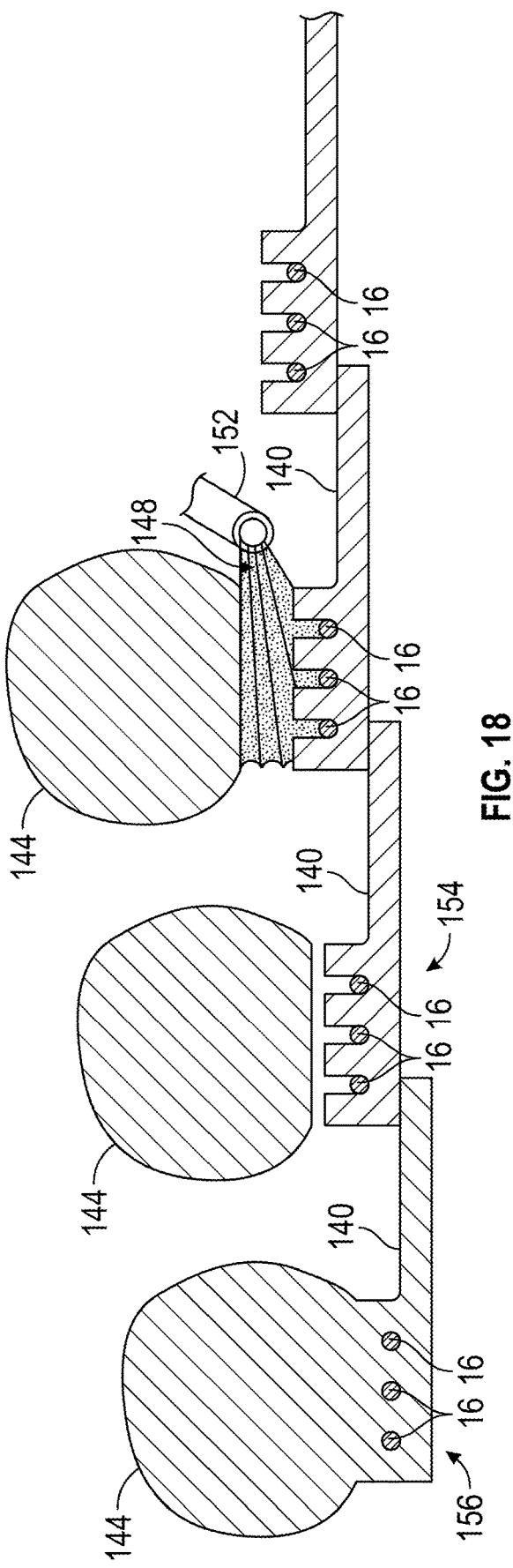

HELICALLY WOUND TUBING WITH EXPOSED CONDUCTORS

CROSS-REFERENCE TO RELATED APPLICATIONS

This application claims the benefit of U.S. Provisional Application No. 63/177,585, filed Apr. 21, 2021, the entire contents of which is incorporated herein by reference.

BACKGROUND

Tubing having a relatively thin wall and an integral helical supporting rib is known in the art. Such support-rib tubing construction provides substantial crush resistance while leaving the tube wall flexible enough to permit short-radius bends without collapsing or kinking the tube. The versatility of this kind of tubing is evidenced by its wide applicability in construction, ventilation, manufacturing processes, auto washes, hospitals, medical devices, and other fields. In medical applications the necessity to maintain a clean environment dictates that the tubing be free of crevices inside or outside in which soil or bacterial contamination could reside. A smooth inner bore for the tubing is also important because flow resistance must be kept to a minimum when a tidal air flow is conducted through the tubing, as is the case with inhalation therapy and other breathing-assistance machines.

Such tubing may be subject to processes that allow the tubing to be used with other apparatuses. For example, when utilizing such tubing in a continuous positive airway pressure (CPAP) application, finishing processes are often applied to such tubing such as end cuffs and electrical couplings. Such finishing processes are often time-consuming and laborious and improved methods of manufacturing and finishing such tubing may be desired.

SUMMARY

Examples of the present disclosure may be directed to tubing and methods of manufacturing tubing, as well as other apparatuses, systems, and methods. The tubing may be utilized in a CPAP application, in which the tubing conveys heated humified air through the lumen of the tubing. One end of the tubing may couple to a separate apparatus such as a CPAP machine (including a humidifier) and another end of the tubing may couple to a headset or mask or other apparatus for wear by the user. The heated humified air may enhance the comfort of the wearer of the CPAP headset. The tubing may include conductors extending helically around the lumen of the tubing, which may be provided with electrical energy via the CPAP machine (including a power source). The heated conductors may heat the air passing through the lumen of the tubing, thus reducing the possibility of the heated humified air condensing into water droplets inside the tubing.

Notably, producing such tubing often involves numerous manufacturing steps, including stripping the conductors for electrical coupling with an electrical terminal. The electrical terminal may couple to an electrical terminal (and power source) of the CPAP machine to provide electrical energy to the conductors. The electrical terminal is often positioned on a cuff of the tubing that also needs to be coupled to an end of the tubing. The process of stripping the conductors and applying the cuffs is time-consuming and laborious, and improvements in the manufacture of the tubing may be desired.

Accordingly, examples disclosed herein may include tubing comprising a tubing wall formed of an elongate thermoplastic ribbon helically wrapped and heat bonded to itself to form the tubing wall. The tubing may include one or more elongate conductors helically wrapped around and along the tubing wall. The tubing may include an elongate reinforcement rib helically wrapped around and along the tubing wall such that the tubing wall includes a first portion in which the elongate reinforcement rib covers the one or more elongate conductors and a second portion in which the one or more elongate conductors are uncovered by the elongate reinforcement rib and the elongate reinforcement rib wraps around the tubing wall.

Examples disclosed herein may include tubing comprising a tubing wall formed of an elongate thermoplastic ribbon helically wrapped and heat bonded to itself to form the tubing wall. The tubing may include an elongate reinforcement rib helically wrapped around and along the tubing wall. The tubing may include one or more elongate conductors helically wrapped around and along the tubing wall and including a first portion covered by the elongate reinforcement rib, and a second portion being uncovered by the elongate reinforcement rib and formed by the elongate reinforcement rib while molten being wrapped offset from the one or more elongate conductors to not cover the one or more elongate conductors.

Examples disclosed herein may include a method including forming a ribbon of molten thermoplastic. The method may include helically wrapping the ribbon so that a portion of the ribbon overlaps upon itself and heat bonds to form a tubing wall. The method may include helically wrapping one or more elongate conductors around and along the tubing wall. The method may include helically wrapping an elongate reinforcement rib over the one or more elongate conductors to cover a first portion of the one or more elongate conductors. The method may include helically wrapping the elongate reinforcement rib over the tubing wall offset from the one or more elongate conductors to form a second portion of the one or more elongate conductors that is uncovered by the elongate reinforcement rib.

Examples disclosed herein may include a method including coupling a cuff to an end of tubing. The tubing may include a tubing wall formed of an elongate thermoplastic ribbon helically wrapped and heat bonded to itself to form the tubing wall. The tubing may include one or more elongate conductors helically wrapped around and along the tubing wall. The tubing may include an elongate reinforcement rib helically wrapped around and along the tubing wall such that the tubing wall includes a first portion in which the elongate reinforcement rib covers the one or more elongate conductors and a second portion in which the one or more elongate conductors are uncovered by the elongate reinforcement rib and the elongate reinforcement rib wraps around the tubing wall, the second portion being positioned at the end of the tubing.

Examples disclosed herein may include tubing comprising a tubing wall formed of an elongate thermoplastic ribbon having a conductor receiving portion that is formed with at least one rib having a convex surface and separating a plurality of channels each configured to receive an elongate conductor, the elongate thermoplastic ribbon being helically wrapped and heat bonded to itself to form the tubing wall. The tubing may include a plurality of elongate conductors helically wrapped around and along the tubing wall and each positioned within a respective one of the plurality of channels. The tubing may include an elongate reinforcement rib helically wrapped around and along the tubing wall and covering the plurality of elongate conductors.

Examples disclosed herein may include a method of making tubing. The method may include forming a ribbon of molten thermoplastic having a conductor receiving portion that is formed with at least one rib having a convex surface and separating a plurality of channels each configured to receive an elongate conductor. The method may include helically wrapping the ribbon so that a portion of the ribbon overlaps upon itself and heat bonds to form a tubing wall. The method may include helically wrapping a plurality of elongate conductors within the plurality of channels. The method may include helically wrapping an elongate reinforcement rib over the plurality of elongate conductors to cover the plurality of elongate conductors.

Examples disclosed herein may include tubing comprising a tubing wall formed of an elongate thermoplastic ribbon helically wrapped and heat bonded to itself to form the tubing wall. One or more elongate conductors may be helically wrapped around and along the tubing wall. An elongate reinforcement rib may be helically wrapped around and along the tubing wall such that the tubing wall includes a first portion in which the elongate reinforcement rib is bonded to the tubing wall and a second portion in which the elongate reinforcement rib has a reduced bonding to the tubing wall relative to the first portion.

Examples disclosed herein may include tubing comprising a tubing wall formed of an elongate thermoplastic ribbon helically wrapped and heat bonded to itself to form the tubing wall. One or more elongate conductors may be helically wrapped around and along the tubing wall. An elongate reinforcement rib may be helically wrapped around and along the tubing wall such that the tubing wall includes a first portion in which the elongate reinforcement rib is bonded to the tubing wall and a second portion formed by the elongate reinforcement rib having a reduced bonding to the tubing wall relative to the first portion.

Examples disclosed herein may include a method including forming a ribbon of molten thermoplastic. The method may include helically wrapping the ribbon so that a portion of the ribbon overlaps upon itself and heat bonds to form a tubing wall. The method may include helically wrapping one or more elongate conductors around and along the tubing wall. The method may include helically wrapping an elongate reinforcement rib around and along a first portion of the tubing wall. The method may include bonding the elongate reinforcement rib to the first portion of the tubing wall. The method may include helically wrapping the elongate reinforcement rib around and along a second portion of the tubing wall. The method may include forming a reduced bond between the elongate reinforcement rib and the second portion of the tubing wall relative to the bond between the elongate reinforcement rib and the first portion of the tubing wall.

Examples disclosed herein may include a method including coupling a cuff to an end of tubing. The tubing may include a tubing wall formed of an elongate thermoplastic ribbon helically wrapped and heat bonded to itself to form the tubing wall, one or more elongate conductors helically wrapped around and along the tubing wall, and an elongate reinforcement rib helically wrapped around and along the tubing wall such that the tubing wall includes a first portion in which the elongate reinforcement rib is bonded to the tubing wall and a second portion formed by the elongate reinforcement rib having a reduced bonding to the tubing wall relative to the first portion.

BRIEF DESCRIPTION OF THE DRAWINGS

Features and advantages of the systems, apparatuses, and methods as disclosed herein will become appreciated as the same become better understood with reference to the specification, claims, and appended drawings wherein:

FIG. 7 provides a fragmentary cross sectional view of an elongate section of a wall of tubing.

FIG. 8 provides a fragmentary cross sectional view of an elongate section of a wall of tubing.

FIG. 9 provides a fragmentary cross sectional view of an elongate section of a wall of tubing.

FIG. 12 is a top view of the layout for manufacturing tubing shown in FIG. 6 with components moved from the position shown in FIG. 6.

FIG. 13 provides a cross sectional view of an elongate thermoplastic ribbon according to an example of the disclosure.

FIG. 14 provides a cross sectional view of a die for an elongate thermoplastic ribbon according to an example of the disclosure.

FIG. 15 provides a fragmentary cross sectional view of an elongate section of a wall of tubing during manufacture.

FIG. 17 provides a fragmentary cross sectional view of an elongate section of a wall of tubing during manufacture.

FIG. 18 provides a fragmentary cross sectional view of an elongate section of a wall of tubing during manufacture.

DETAILED DESCRIPTION

Figure 1:
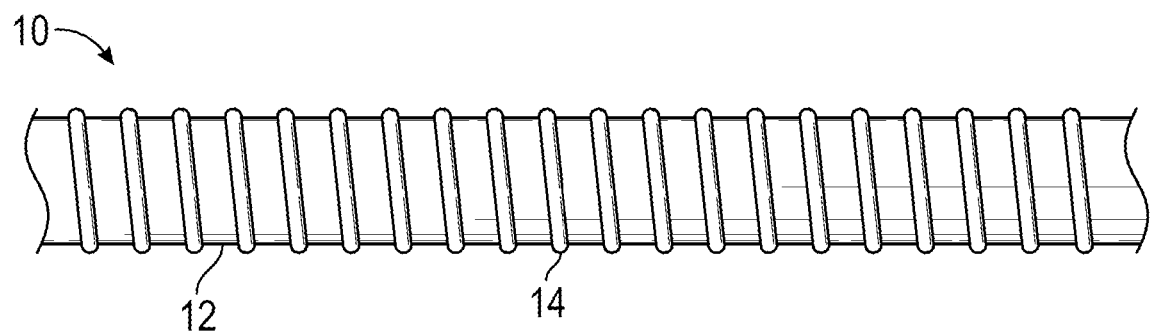
FIG. 1 provides an exterior view of tubing according to an example of the disclosure.

FIG. 1 illustrates a side view of tubing 10 according to an example of the present disclosure. The tubing 10 has a tubing wall 12 and an elongate reinforcement rib 14 helically wrapped around and along the tubing wall 12. The elongate reinforcement rib 14 is shown protruding above the tubing wall 12.

The tubing wall 12 may surround a lumen of the tubing 10, and the lumen may be configured to convey fluids such as gas or liquid, or a combination of gas and liquid in the form of humified gas or air. The tubing wall 12 may be flexible to allow for movement of the tubing 10 as desired. The elongate reinforcement rib 14 may provide support and rigidity for the tubing 10, and may prevent the tubing 10 from being easily crushed or flattened. The elongate reinforcement rib 14 may encapsulate one or more elongate conductors of the tubing 10.

Figure 2:
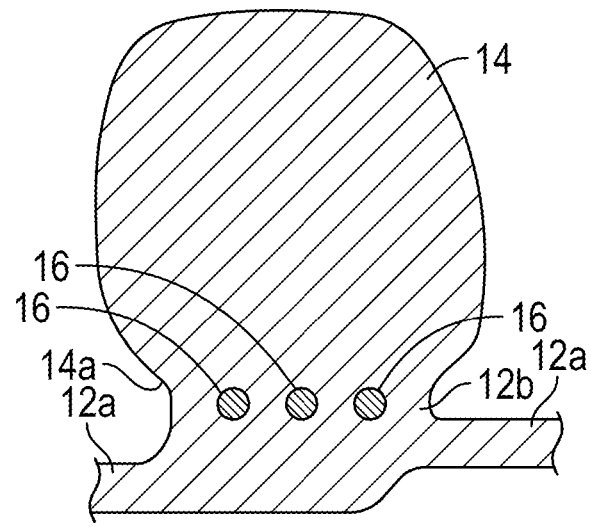
FIG. 2 is a fragmentary cross sectional view of the tubing seen in FIG. 1.

FIG. 2, for example, illustrates a fragmentary cross sectional view of the tubing wall 12 shown in FIG. 1 at the elongate reinforcement rib 14. The tubing wall 12 may include a relatively thin and flexible portion 12a extending between adjacent ribs 14, and a conductor receiving portion 12b positioned adjacent to the thin portion 12a and configured to helically wrap around and along the tubing wall and configured to receive the one or more elongate conductors 16. The conductor receiving portion 12b may comprise a plateau portion of the tubing wall that may be relatively thicker than the thin portion 12a that is positioned adjacent to the receiving portion 12b. That is, the conductor receiving portion may protrude radially outwardly. Further, the rib 14 resides atop of this conductor receiving portion 12b so that the rib 14 is elevated at its base 14a radially outwardly of the tubing wall 12. Within the conductor receiving portion 12b the tubing includes a plurality of spaced apart elongate conductors 16. The rib 14 covers the spaced apart elongate conductors 16. The elongate conductors 16 may be made of metal, so that they will conduct electricity. Alternatively, one or all of the elongate conductors 16 may be made of glass or plastic (i.e., a fiber optic conductor) so that it will conduct optical signals. Thus, the elongate conductors 16 may be used for electrical resistance heating, for electrical signal conduction (i.e., for instrumentation or telemetry signals) or for optical signals. The elongate conductors 16 may be in the form of wires.

Figure 3:
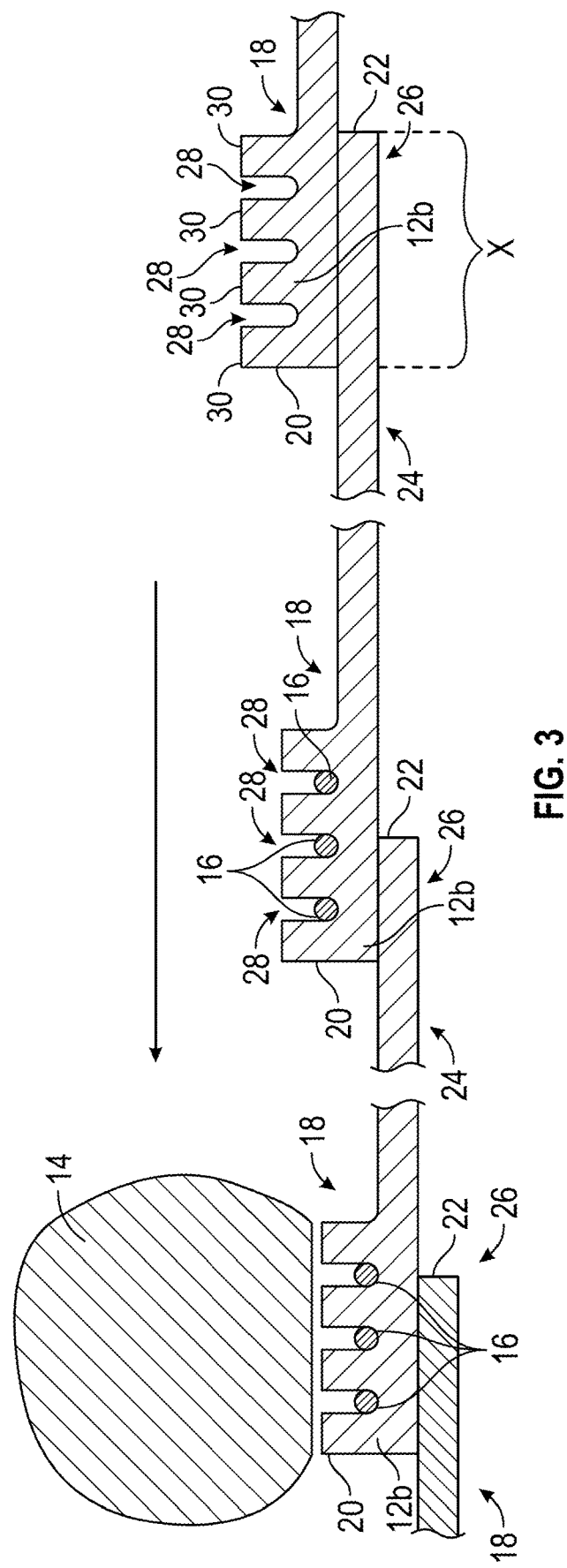
FIG. 3 provides a fragmentary cross sectional view of an elongate section of the wall of the tubing seen in FIGS. 1 and 2 during manufacture.

FIG. 3 illustrates a fragmentary cross sectional view of an elongate section of the wall of the tubing 10 seen in FIGS. 1 and 2 during manufacture. Process steps of manufacturing the tubing 10 are illustrated in FIG. 3. Starting at the rightmost portion of FIG. 3, the tubing wall 12 of the tubing 10 may be formed of an elongate thermoplastic ribbon 18 helically wrapped and heat bonded to itself to form the tubing wall 12. The elongate thermoplastic ribbon 18 may comprise an extrudate that is produced in a molten state and has a leading edge 20 and a trailing edge 22. The extrusion die utilized to produce the ribbon 18 may be shaped to result in the shape of the elongate thermoplastic ribbon 18 shown in FIG. 3.

The elongate thermoplastic ribbon 18 is wrapped about canted and rotating mandrels (represented in FIG. 6) and is advanced helically toward the left of FIG. 3 (as is indicated by the arrow on FIG. 3). The ribbon 18 encircles the rolls and wraps upon itself with a certain overlap "X," as seen in FIG. 3. The molten ribbon 18 heat bonds to itself to form successive wraps or convolutions 24 and to form the tubing wall 12. The adjacent wraps or convolutions 24 of the ribbon 18 heat-bond integrally to one another to form a helical lap joint 26 in the tubing wall 12. This lap joint 26 is disposed beneath the conductor receiving portion 12b. That is, the lap joint 26 is toward the inside of the tubing wall 12 relative to the conductor receiving portion 12b.

Figure 4:
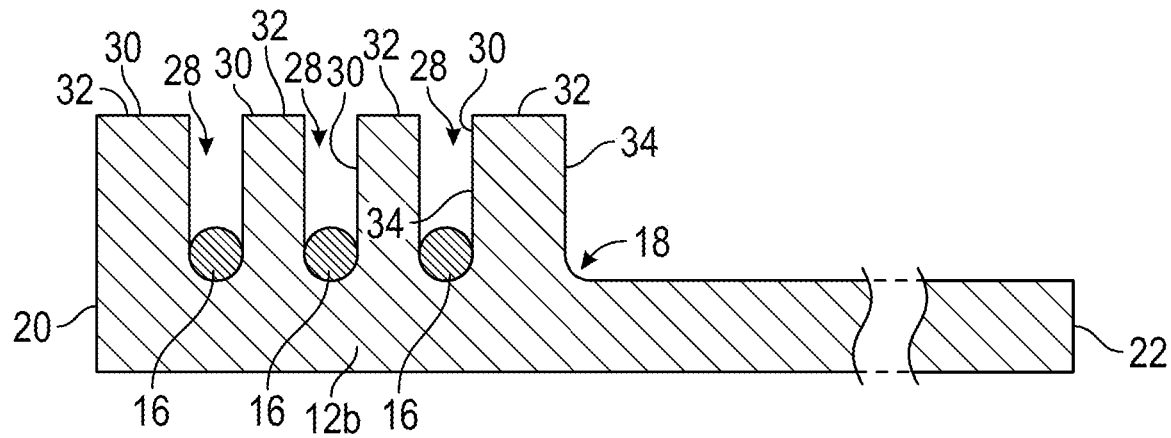
FIG. 4 is a greatly enlarged fragmentary cross sectional view of a portion of the tubing wall seen in FIG. 3 during manufacture.

The ribbon 18 may include the conductor receiving portion 12b, which may be in the form of a thickened plateau. The conductor receiving portion 12b may be at the leading edge 20 of the ribbon 18. The conductor receiving portion 12b may include one or more channels 28 that are each configured to receive one of the elongate conductors 16, and one or more ribs 30 that may separate the channels 28 from each other or otherwise be positioned adjacent to the channels 28. FIG. 3, for example, illustrates three channels 28 and four ribs 30, with two interior ribs 30 separating a central channel 28, and two outer ribs positioned adjacent to the outer channels 28. FIG. 4 illustrates a close up view of the ribbon 18, showing that the outer two ribs 30 may be wider than the center two ribs 30 in this example. That is, the center two ribs 30 may have a unit width, and the outer two ribs 30 may have a width of 1 ½ units. Further, because of its thickness compared to the remainder of the ribbon 18, the conductor receiving portion 12b at the channels 28 and ribs 30 is somewhat raised radially outward on the outside of the tubing wall 12.

Further, as shown in FIG. 4, the ribs 30 may each have a flattened top surface 32 and flattened side surfaces 34. The portion of the conductor receiving portion 12b between the ribs 30 may have a concave shape that defines the shape of the bottom of the channels 28. Each rib 30 may protrude from the ribbon 18 and may have a height that is greater than a thickness of the conductors 16.

Referring back to FIG. 3, the manufacturing step shown in the middle of FIG. 3 includes helically wrapping one or more of the elongate conductors 16 around and along the tubing wall within the respective channels 28. The ribs 30 of the conductor receiving portion 12b may serve to position the elongate conductors 16 such that the conductors are maintained in a desired orientation and spacing from each other upon the tubing wall 12. Each of the elongate conductors 16 may be aligned with a respective one of the channels 28 to allow for insertion of the elongate conductors 16 into the channels 28 as the elongate conductors 16 are wrapped within the respective channel 28.

Figure 5:
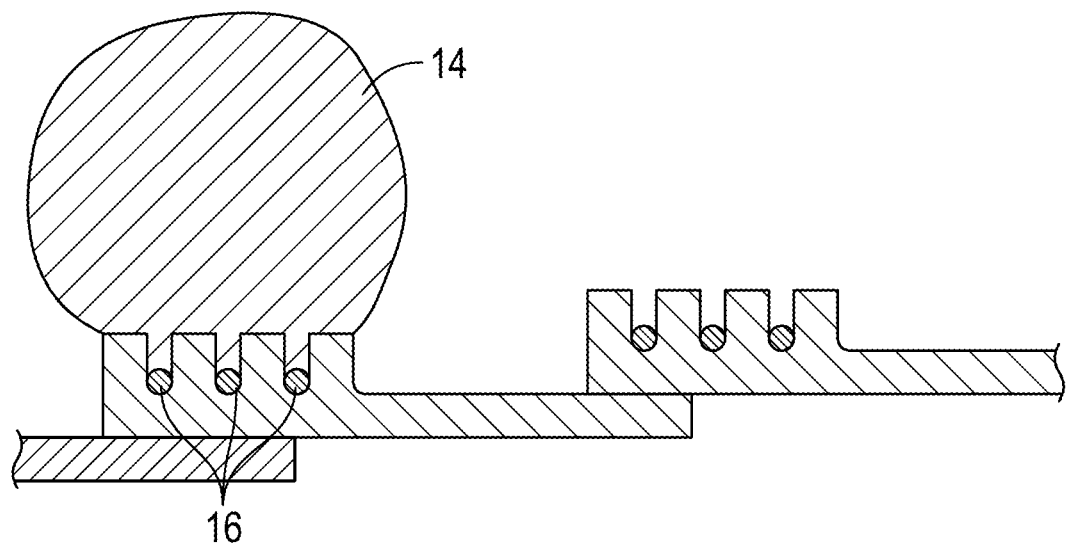
FIG. 5 is a greatly enlarged fragmentary cross sectional view illustrating a subsequent step of manufacture of the tubing according to the disclosure.

In the manufacturing step shown to the left in FIG. 3, a molten elongate reinforcement rib 14 is applied helically onto the conductor receiving portion 12b and heat-bonds integrally thereto, capturing the conductors 16 in an integral tubing structure. It will be noted viewing FIG. 3 that the rib 14 is not quite yet in place on conductor receiving portion 12b. However, FIG. 5 illustrates the rib 14 in its final position integrally bonding on conductor receiving portion 12b and defining the rib 14 of the finished tubing 10. The rib 14 covers and encapsulates the conductors 16. The rib 14, integrally bonded with the conductor receiving portion 12b, may have an appearance as shown in FIG. 2.

The elongate reinforcement rib 14 may be extruded in a similar manner that the elongate thermoplastic ribbon 18 is extruded. Machinery may be utilized to produce the tubing 10 and perform the manufacturing processes shown in FIGS. 3-5.

Figure 6:
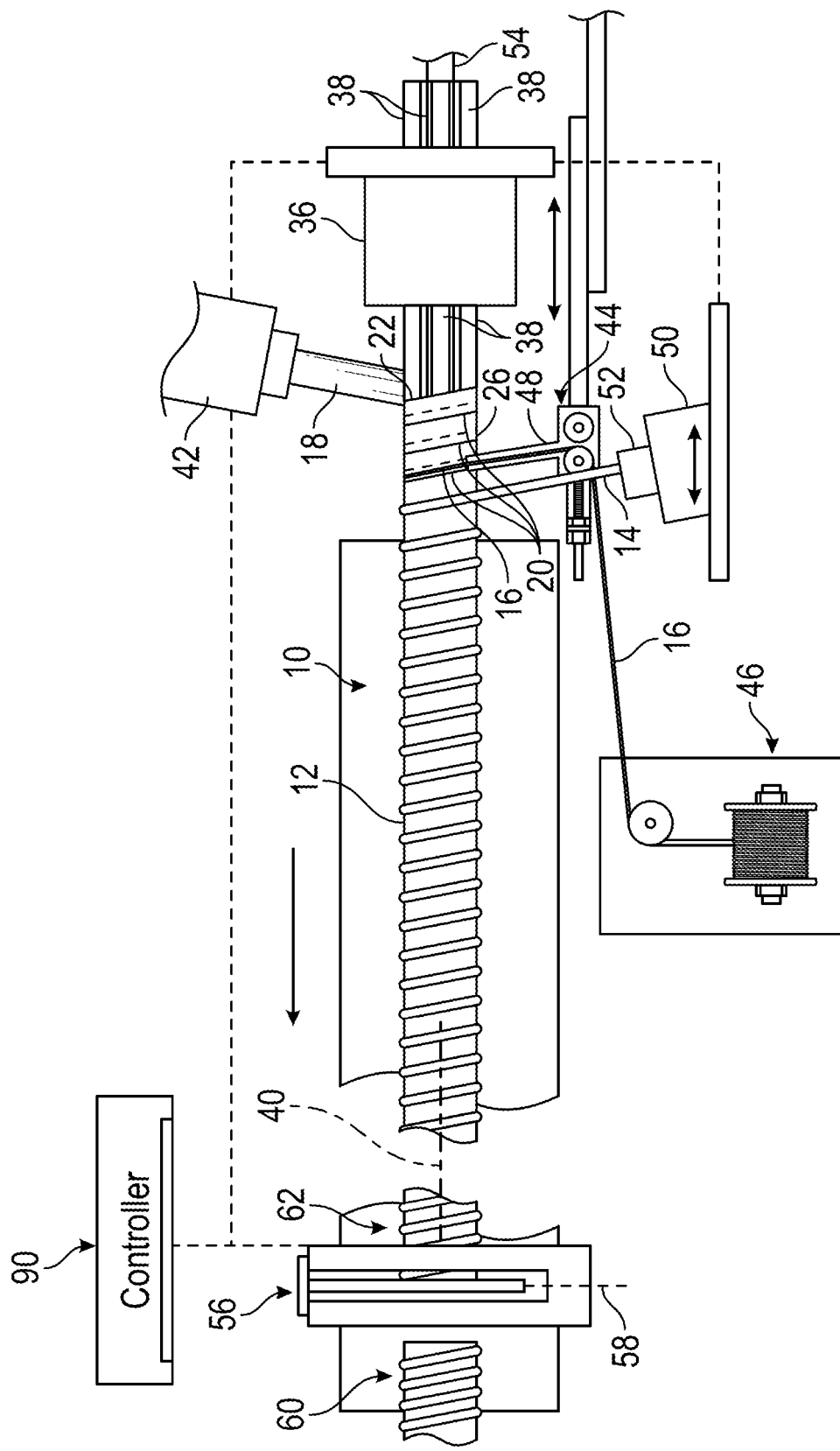
FIG. 6 is a top view of a layout for manufacturing tubing according to an example of the disclosure.

FIG. 6, for example, illustrates a top view of a layout for manufacturing the tubing 10. As shown in FIG. 6, mandrel motor 36 is configured to rotate mandrels 38, which are canted and spaced about longitudinal axis 40 for winding and rotationally advancing tubing 10. In one implementation, the mandrels 38 can rotate together in a clockwise direction.

The elongate thermoplastic ribbon 18 and elongate reinforcement rib 14 may be extruded through use of extruders. A first extruder 42 may be configured to extrude elongate thermoplastic ribbon 18 in the form shown in the rightmost portion of FIG. 3. The extruder 42 may include an extrusion die that is shaped to result in the shape of the elongate thermoplastic ribbon 18 shown in FIG. 3. For example, the extrusion die may have a shape that includes the channels 28 and ribs 30 of the conductor receiving portion 12b of the tubing wall 12.

The elongate thermoplastic ribbon 18 is discharged in a molten state from the first extruder 42 and helically wrapped about mandrels 38 so that the ribbon 18 encircles mandrels 38 and wraps upon itself at the helical lap joint 26 as shown in FIGS. 3 and 6. The ribbon 18 is wrapped to form successive wraps of the ribbon 18 forming the tubing wall 12. As tubing wall 12 cools and solidifies, it is advanced toward the left in the direction of the arrow shown in FIG. 6.

A conductor feeding mechanism 44 employs payout mechanism 46 for feeding and embedding one or more of the conductors 16 into the conductor receiving portion 12b of the tubing wall 12. A single conductor 16 is represented in FIG. 6, however, a plurality of conductors 16 (e.g., two conductors, or three conductors as shown in FIG. 3, or a greater number of conductors) may be wrapped around the tubing wall 12 and into the channels 28 of the conductor receiving portion 12b as shown in the middle portion of FIG. 3. The conductors 16 may be aligned with the channels 28 of the conductor receiving portion 12b upon being wrapped around the conductor receiving portion 12b and a conductor guide 48 may be utilized to position the conductors 16 within the channels 28. The conductor guide 48 may be in the form of a trough, for example, or may have another form as desired. The ribs 30 shown in FIG. 3 may further serve to position the conductors 16 within the channels 28. The conductors 16 positioned within the channels 28 may have an appearance as shown in the middle portion of FIG. 3.

A second extruder 50 may be configured to extrude the elongate reinforcement rib 14. The extruded elongate reinforcement rib 14 may be emitted from an extrusion guide 52 that may define the position of the extruded elongate reinforcement rib 14 upon the tubing wall 12. The extrusion guide 52 may position the extruded elongate reinforcement rib 14 in alignment with the conductor receiving portion 12b such that the rib 14 is positioned upon the conductor receiving portion 12b and covers the conductors 16 as shown in FIGS. 3 and 5. Although first extruder 42 and second extruder 50 are shown as physically separate extruding machines in FIG. 6, it should be understood that both ribbon 18 and rib 14 may be extruded from a single extrusion machine with a co-located die in certain examples.

The canting of mandrels 38 causes tubing 10 to move continuously in a downstream direction as indicated by the arrow. In the example of FIG. 6, cooling conduit 54 may be positioned within the lumen of the tubing 10 and may spray water directed radially outwardly against the inner surface of the tubing wall 10, and also in the downstream direction which assists in removing tubing 10 after cutting. The tubing 10 may be subjected to cooling via water or another method during and after formation of the tubing 10. Further cooling may include use of a cooling trough to the left of the machinery shown in FIG. 6, or prior to the cutting step shown in FIG. 6. The cooling trough may contain water into which the tubing enters as it proceeds leftwardly. The cooling water may cool the tubing 10 from its molten condition to a finished flexible plastic integral tubing.

A cutting mechanism 56 may be utilized that is configured to cut tubing 10 in determined lengths along a cut line 58. The cutting mechanism 56 may be configured to periodically cut tubing 10 at a predetermined time period corresponding to a particular length for tubing 10. The cutting may result in ends 60, 62 of the tubing 10.

The resulting tubing 10 may include a thin flexible wall section (formed by the thin portion 12a) extending between adjacent wraps of the elongate reinforcement rib 14, as is seen best in FIG. 1. This thin flexible wall portion may provide for exceptional flexibility for the tubing 10, while the rib 14 provides support for the wall so that the tubing is collapse-resistant. Also, the conductors 16 may be uniformly spaced apart as they extend helically along the tubing within the conductor receiving portion 12b captured by the rib 14. This spacing apart of the conductors 16 provides a number of benefits. When a pair of the conductors are employed for electrical resistance heating, the heating is more dispersed than with conventional tubing. Similarly, the electrical properties of the conductors when used to convey electrical signals is favorable to this use. And, telemetry or instrumentation signals (i.e., light or electrical) may be conducted along the conductors 16. Moreover, the spacing apart of these conductors 16 ensures both improved insulation of the conductors from one another, an improved capacitance value between the conductors (and improved uniformity of this capacitance value), and reduced mutual inductive coupling among the conductors.

Notably, upon the tubing 10 being cut along cut line 58 shown in FIG. 6, the ends 60, 62 of the tubing 10 include portions in which the elongate reinforcement rib 14 covers the elongate conductors 16. If the conductors 16 are to be coupled to an additional component, such as an electrical terminal, then access to the conductors 16 must be provided. For example, if the conductors 16 are to be utilized for heating a fluid, such as a liquid or gas or combination thereof, passing through the lumen of the tubing 10, then the ends of the conductors 16 may be coupled to an electrical terminal to provide electrical energy to the conductors 16 to heat the conductors 16 and accordingly heat the fluid within the lumen. The conductors 16, however, in the resulting state shown in FIG. 6 are covered by the elongate reinforcement rib 14 and encapsulated within the conductor receiving portion 12b. The left part of FIG. 5, for example, illustrates this state of encapsulation. Access to the ends of the conductors 16 may occur in one or processing steps following the cutting step shown in FIG. 6.

Such processing steps may include cutting the elongate reinforcement rib 14 away from the tubing wall 12 to expose the conductors 16 at an end 60, 62 of the tubing. The rib 14 may further be stripped away from the ends of the conductors 16 utilizing a wire stripper or the like. These processing steps may occur manually. The exposed ends of the conductors 16 may then be coupled to an electrical terminal. However, these processing steps may add time and labor to manually expose the conductors 16.

As such, the manufacturing system may be configured to automatically expose conductors at a desired portion of the tubing, which may be the ends of the tubing. Processing steps may be utilized such that the tubing wall 12 includes a portion in which the elongate conductors 16 are uncovered by the elongate reinforcement rib 14 and the elongate reinforcement rib 14 wraps around the tubing wall 12. Such processing steps may reduce the manual labor associated with exposing the conductors 16.

The conductors 16 may be uncovered by the elongate reinforcement rib 14 by the elongate reinforcement rib 14 being helically wrapped over the tubing wall 12 offset from the conductors 16. The elongate reinforcement rib 14 may be helically wrapped over the tubing wall 12 offset from the conductors 16 in a variety of manners as shown, for example, in FIGS. 7-9. The elongate reinforcement rib 14 may be helically wrapped around and along the tubing wall 12 such that the tubing wall 12 includes a first portion in which the elongate reinforcement rib 14 covers the one or more elongate conductors 16 and a second portion in which the one or more elongate conductors 16 are uncovered by the elongate reinforcement rib 14 and the elongate reinforcement rib 14 wraps around the tubing wall 12.

In the rightmost portion of FIG. 7, for example, the tubing is shown to include an elongate reinforcement rib 14 positioned over the elongate conductors 16 and bonded to the conductor receiving portion 12*b*. Such a portion may correspond to portion 70*b* shown in FIG. 10A for example.

In the first from rightmost portion of FIG. 7, the elongate conductors 16 are helically wrapped offset from the conductor receiving portion 12*b*. The elongate conductors 16, for example, may be wrapped around the thin portion 12*a* of the tubing wall 12 and are not aligned with the channels 28 and are not positioned within the channels 28. As such, the elongate conductors 16 may rest upon an outer surface of the tubing wall 12. The elongate reinforcement rib 14 may then be helically wrapped around the tubing wall 12 offset from the conductors 16 and over the conductor receiving portion 12*b*. As such, the elongate conductors 16 are uncovered by the elongate reinforcement rib 14 in the first from rightmost portion of FIG. 7. Such a portion may correspond to the portions between portions 64 and 70*b* shown in FIG. 10A.

Notably, the elongate conductors 16 may be uncovered by the elongate reinforcement rib 14 for only a portion of the tubing wall 12. As such, as shown in the first from leftmost portion, the elongate conductors 16 may be moved back into the channels 28. The elongate conductors 16 may then be covered by the elongate reinforcement rib 14. In the leftmost portion of FIG. 7, the tubing wall 12 may include a portion in which the elongate reinforcement rib 14 covers the conductors 16 positioned within the conductor receiving portion 12*b*. This portion may be formed in the manner shown in FIG. 3. The leftmost and first from leftmost portions may correspond to the portion 64 shown in FIG. 10A.

FIG. 8 illustrates an example in which the elongate reinforcement rib 14 is helically wrapped offset from the conductor receiving portion 12*b*. The elongate conductors 16, however, may be helically wrapped within the channels 28 of the conductor receiving portion 12*b*. The elongate reinforcement rib 14 is accordingly helically wrapped over the tubing wall 12 offset from the conductors 16.

In the rightmost portion of FIG. 8, for example, the elongate reinforcement rib 14 is positioned over the elongate conductors 16 and bonded to the conductor receiving portion 12*b*. Such a portion may correspond to portion 70*b* shown in FIG. 10A for example.

In the first from rightmost portion of FIG. 8, the elongate reinforcement rib 14 is helically wrapped offset from the conductor receiving portion 12*b*. The elongate reinforcement rib 14 may be helically wrapped, for example, over an adjacent thin portion 12*a* of the tubing wall 12 as shown in the first from rightmost portion of FIG. 8. Such a portion may correspond to the portions between portions 64 and 70*b* shown in FIG. 10A.

As with the example of FIG. 7, the tubing wall 12 may include a portion in which the elongate reinforcement rib 14 covers the conductors 16 positioned within the conductor receiving portion 12*b* as shown in the first from leftmost and leftmost portion of FIG. 8. This portion may be formed in the manner shown in FIG. 3. The elongate reinforcement rib 14 accordingly may be moved back upon the conductor receiving portion 12*b* in the first from leftmost portion of FIG. 8. The leftmost and first from leftmost portions may correspond to portion 64 shown in FIG. 10A.

FIG. 9 illustrates an example in which both the elongate reinforcement rib 14 and the elongate conductors 16 are helically wrapped offset from the conductor receiving portion 12*b*.

In the rightmost portion of FIG. 9, for example, the elongate reinforcement rib 14 is positioned over the elongate conductors 16 and bonded to the conductor receiving portion 12*b*. Such a portion may correspond to portion 70*b* shown in FIG. 10A for example.

In the first from rightmost portion of FIG. 9, the conductors 16 may be helically wrapped over the thin portion 12*a* of the tubing wall 12, offset from the conductor receiving portion 12*b* and the channels 28. As shown in the first from rightmost portion of FIG. 9, the elongate reinforcement rib 14 is helically wrapped over the thin portion 12*a* of the tubing wall 12, also offset from the conductor receiving portion 12*b* and the channels 28. The elongate reinforcement rib 14 is helically wrapped over the tubing wall 12 offset from the conductors 16. One or more of the elongate reinforcement rib 14 or the one or more elongate conductors 16 may be offset from the conductor receiving portion 12*b*. One or more of the elongate reinforcement rib 14 or the one or more elongate conductors 16 may be positioned on the adjacent thin portion 12*a* of the tubing wall 12.

In the second from rightmost portion of FIG. 9, the elongate conductors 16 may be moved into the channels 28 with the rib 14 offset from the conductor receiving portion 12*b*. The first from rightmost and second from rightmost portions of FIG. 9 may correspond to the portions between portions 64 and 70*b* shown in FIG. 10A.

In the first from leftmost and leftmost portions of FIG. 9, the tubing wall 12 may include a portion in which the elongate reinforcement rib 14 covers the conductors 16 positioned within the conductor receiving portion 12*b*. This portion may be formed in the manner shown in FIG. 3. The first from leftmost and leftmost portions may correspond to portion 64 shown in FIG. 10A.

The tubing walls formed in FIGS. 7-9 may accordingly include a portion in which the elongate reinforcement rib 14 covers the elongate conductors 16 (as shown in the leftmost and rightmost portions of FIGS. 7-9), and a portion in which the elongate conductors 16 are uncovered by the elongate reinforcement rib 14 and the elongate reinforcement rib 14 wraps around the tubing wall 12. The elongate reinforcement rib 14 may be heat bonded to the tubing wall 12 at both portions of the tubing wall 12. During formation of the tubing walls, the portion in which the elongate conductors 16 are uncovered by the elongate reinforcement rib 14 may comprise a relatively shorter portion of the tubing 10. Thus the portion in which the elongate reinforcement rib 14 covers the elongate conductors 16 may extend for a greater length than the portion in which the elongate conductors 16 are uncovered by the elongate reinforcement rib 14.

Further, the portions in which the elongate reinforcement rib 14 covers the elongate conductors 16, and in which the elongate conductors 16 are uncovered by the elongate reinforcement rib 14, may alternate during formation of the tubing 10. The portions may alternate such that the tubing 10 may be cut at the portion in which the elongate conductors 16 are uncovered by the elongate reinforcement rib 14 to form a first end of the tubing 10 and the machinery may continue to form a portion in which the elongate reinforcement rib 14 covers the elongate conductors 16. The machinery may then alternatively form a portion in which the elongate conductors 16 are uncovered by the elongate reinforcement rib 14, such that the tubing 10 is cut at this portion to form a second end of the tubing 10. The portion in which the elongate reinforcement rib 14 covers the elongate conductors 16 may be positioned between the ends of the tubing wall. The machinery may then form a portion in which the elongate reinforcement rib 14 covers the elongate conductors 16 to form a next tubing, and the cutting and formation sequence may continue for a desired duration of time.

Figure 10A:
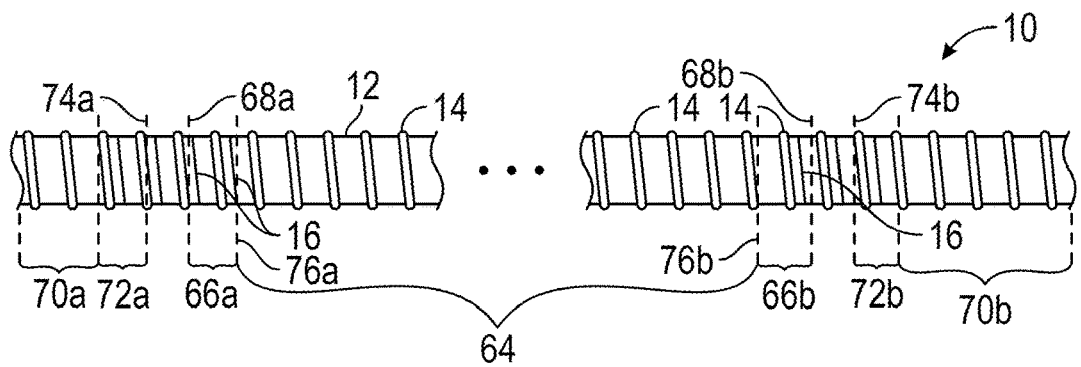
FIG. 10A provides an exterior view of tubing according to an example of the disclosure.
Figure 10B:
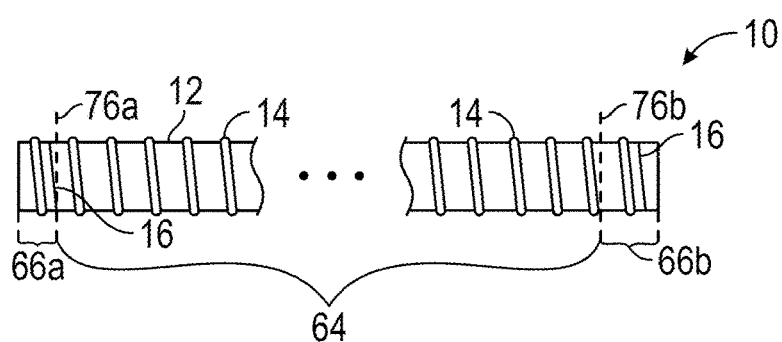
FIG. 10B provides an exterior view of the tubing of FIG. 10A having been cut according to an example of the disclosure.

FIG. 10A, for example, illustrates a tubing 10 including a portion 64 in which the elongate reinforcement rib 14 covers the elongate conductors 16. The portion 64 may comprise a central portion of the tubing 10. The portion 64 may be formed by a method shown in FIG. 3 and may be configured similarly as shown in the leftmost portions of FIGS. 7-9. The tubing 10 may include one or more portions 66a, b in which the elongate conductors 16 are uncovered by the elongate reinforcement rib 14 and the elongate reinforcement rib 14 wraps around the tubing wall 12 (as shown in the middle portion of FIGS. 7-9). The portion 64 may be positioned between the portions 66a, b. Cut lines 68a, b may be provided for cutting machinery to cut the tubing 10, such that the portions 66a, b form the ends of the tubing 10. FIG. 10B, for example, shows the tubing 10 having been cut along cut lines 68a, b such that the portions 66a, b form the ends of the tubing 10.

Referring back to FIG. 10A, the tubing is shown to include additional portions 70a, b in which the elongate reinforcement rib 14 covers the elongate conductors 16. These may be portions of other tubing that are formed during the formation process. This other tubing may similarly include respective portions 72a, b in which the elongate conductors 16 are uncovered by the elongate reinforcement rib 14 and the elongate reinforcement rib 14 wraps around the tubing wall, which may be cut at cut lines 74a, b to form the ends of the other tubing. The portions of the tubing in between portions 72a and 66a may comprise scrap material, as well as the portions of the tubing in between portions 72b and 66b. In other examples, for example as shown in FIGS. 11A-11D, no scrap material may exist between the tubing. As discussed, the portions in which the elongate reinforcement rib 14 covers the elongate conductors 16, and in which the elongate conductors 16 are uncovered by the elongate reinforcement rib 14, may alternate.

Referring however to FIG. 10B, a resulting tubing 10 may include end portions 66a, 66b having one or more exposed elongate conductors 16. The elongate conductors 16 may be exposed in any manner shown in the middle portions of FIGS. 7-9, by the elongate reinforcement rib 14 being offset from the one or more elongate conductors 16. In this manner, the exposed elongate conductors 16 may be more easily accessed and pulled from the outer surface of the tubing wall 12 because they are not covered by the elongate reinforcement rib 14. The end portion 66b, for example may comprise a second portion in which the one or more elongate conductors are uncovered by the elongate reinforcement rib and the elongate reinforcement rib wraps around the tubing wall. The end portion 66b, for example, may comprise a third portion in which the one or more elongate conductors are uncovered by the elongate reinforcement rib and the elongate reinforcement rib wraps around the tubing wall. The third portion may be an end of the tubing wall. The portion 64 may comprise a first portion in which the elongate reinforcement rib covers the one or more elongate conductors. The first portion may be positioned between the second portion and the third portion of the tubing wall. An individual performing finishing processes on the tubing 10 may be able to more easily access the elongate conductors 16 without having to cut or strip the elongate reinforcement rib 14 from the elongate conductors 16. A variety of finishing processes may be performed upon the tubing 10. Automated finishing processes may be provided in examples.

Figure 10C:
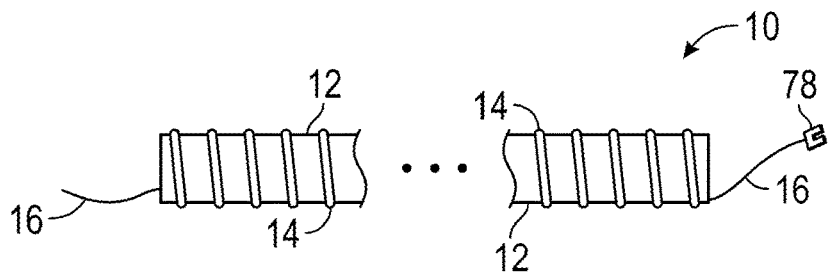
FIG. 10C provides an exterior view of the tubing of FIG. 10B having been cut according to an example of the disclosure.
Figure 10D:
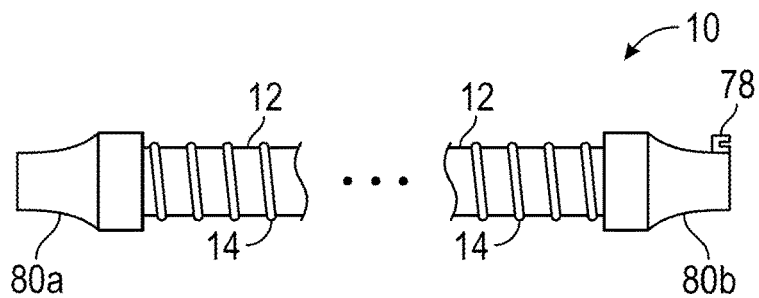
FIG. 10D provides an exterior view of the tubing of FIG. 10C having cuffs added to the ends of the tubing according to an example of the disclosure.

FIG. 10C for example, illustrates the tubing 10 having the portions 66a, b cut from the tubing 10 along respective cut lines 76a, b shown in FIG. 10B. The conductors 16 may extend outward from the tubing 10, and one end of the conductors 16 may be electrically coupled to an electrical terminal 78. The electrical terminal 78 may be configured to electrically couple to a second electrical terminal (such as an electrical terminal for a power source) to provide electrical energy to the conductors 16. A further finishing process is shown in FIG. 10D, in which cuffs 80a, b may be coupled to the ends of the tubing 10, which are configured to couple to apparatuses for conveying fluid flow (gas or liquid, or a combination) through the lumen of the tubing 10. The electrical terminal 78 may be positioned on one of the cuffs 80b as shown in FIG. 10D, for coupling to the second electrical terminal. The cuffs 80a, b may be molded directly on the ends of the tubing or may be coupled via another method.

In examples, the portions 66a, b shown in FIG. 10B may not be cut from the tubing 10 and the cuffs 80a, b may be coupled to the portions 66a, b shown in FIG. 10B. The conductors 16 may still be electrically coupled to the electrical terminal 78.

FIGS. 11A-11D illustrate an example that is similar to the example of FIGS. 10A-10D, yet the tubing lacks the intermediate portion between lines 74a and 68a in FIG. 10A, and the intermediate portion between lines 74b and 68b in FIG. 10A and lines 74a and 68a in FIG. 10A. As such, no scrap material may exist between the tubing. Rather, in FIG. 11A, cuts along cut lines 68a, 68b may be made to move to FIG. 11B. Cuts may then be made along lines 76a, 76b to move to FIG. 11C. Further, referring back to FIG. 11A, cuts of adjacent tubing may be made along cut lines 75a, b for that tubing.

Figure 11A:
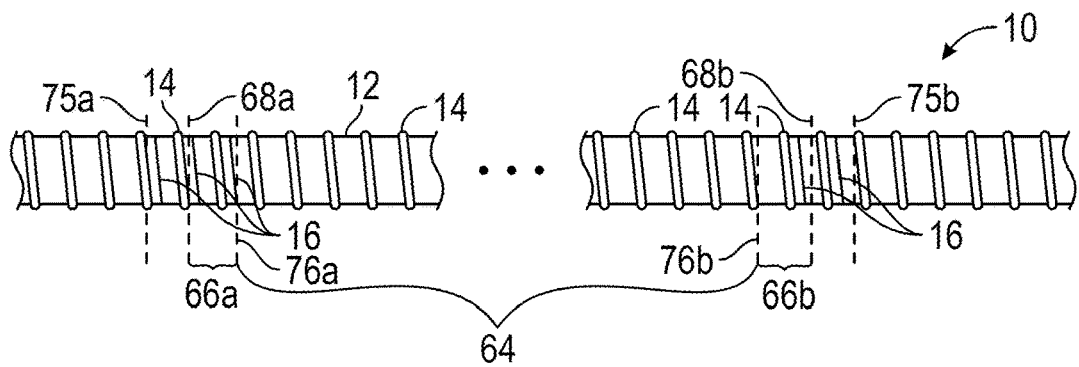
FIG. 11A provides an exterior view of tubing according to an example of the disclosure.
Figure 11B:
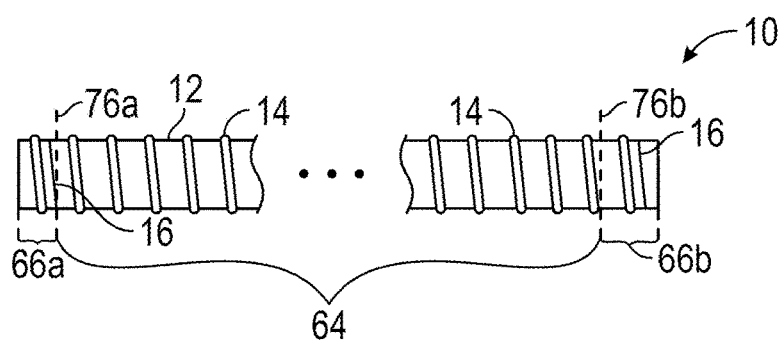
FIG. 11B provides an exterior view of the tubing of FIG. 11A having been cut according to an example of the disclosure.
Figure 11C:
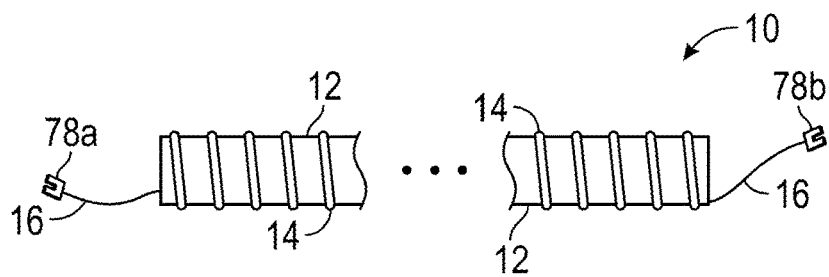
FIG. 11C provides an exterior view of the tubing of FIG. 11B having been cut according to an example of the disclosure.
Figure 11D:
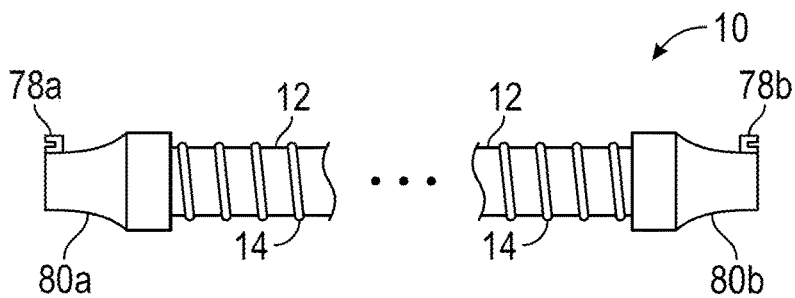
FIG. 11D provides an exterior view of the tubing of FIG. 11C having cuffs added to the ends of the tubing according to an example of the disclosure.

Referring to FIGS. 11C and 11D, electrical terminals 78a, 78b may be applied to both ends of the tubing and may be coupled to cuffs 80a, 80b respectively. Thus, both cuffs 80a, 80b may include electrical terminals 78a, 78b if desired. Such a feature may be utilized with the example of FIGS.

10A-10D if desired. The cuff 80a may include an electrical terminal 78a, which may be referred to as a third electrical terminal that is configured to electrically couple to a fourth electrical terminal (such as an electrical terminal for a power source or for a CPAP apparatus or other structure) to convey electrical energy with the conductors 16. The electrical terminal 78a may be electrically coupled to the conductors 16 at a third portion of the conductors 16 for example.

FIG. 12 illustrates an operation of the machinery shown in FIG. 6 that may result in the portions 66a, b in which the elongate conductors 16 are uncovered by the elongate reinforcement rib 14 and the elongate reinforcement rib 14 wraps around the tubing wall 12 (as shown in the middle portions of FIGS. 7-9). The machinery may be configured to include a relocation mechanism. The relocation mechanism may move one or more of the conductor guide 48 or the extrusion guide 52 for one or more of the conductor guide 48 or the extrusion guide 52 to move the position that the respective elongate conductors 16 or elongate reinforcement rib 14, or both, are helically wrapped around the tubing wall 12. The conductor guide 48 or the extrusion guide 52 may be configured to be movable to move the position that the respective elongate conductors 16 or elongate reinforcement rib 14 are helically wrapped around the tubing wall 12.

The conductor guide 48 may be configured to be movable to vary the position of the elongate conductors 16 in an axial direction relative to the tubing wall 12. The conductor guide 48, for example, may be coupled to a relocation mechanism in the form of a rail mechanism 82 for moving the conductor guide 48, to vary the position of the elongate conductors 16 relative to the tubing wall 12. The extrusion guide 52 may also be configured to be movable to vary the position of the elongate reinforcement rib 14 in an axial direction relative to the tubing wall 12. The extrusion guide 52, for example, may be coupled to a relocation mechanism in the form of a rail mechanism 84 for moving the extrusion guide 52, to vary the position of the elongate reinforcement rib 14 relative to the tubing wall 12.

Either the conductor guide 48 or the extrusion guide 52 or both may be movable. For example, in a configuration as shown in FIG. 7, the conductor guide 48 may be movable to move the position of the elongate conductors 16 to be offset from the channels 28 of the conductor receiving portion 12b. In a configuration as shown in FIG. 8, the extrusion guide 52 may be movable to move the position of the elongate reinforcement rib 14 to be offset from the conductor receiving portion 12b. In a configuration as shown in FIG. 9, both the conductor guide 48 and the extrusion guide 52 may be movable to offset both the elongate reinforcement rib 14 and the elongate conductors 16 from the conductor receiving portion 12b. The portion formed in which the elongate reinforcement rib 14 is offset from the elongate conductors 16 and the elongate conductors 16 are uncovered by the elongate reinforcement rib 14 and the elongate reinforcement rib 14 wraps around the tubing wall 12 (as shown in the middle portions of FIGS. 7-9), may travel leftward in FIG. 12 for being cut along cut line 58, to form an end 86 of the tubing 10 (and an end 88 of the adjacent tubing). The elongate reinforcement rib 14 while molten may be wrapped offset from the one or more elongates conductors to not cover the one or more elongate conductors.

The conductor guide 48 or the extrusion guide 52, or both, may be moved back to their respective original positions to realign the elongate reinforcement rib 14 with the elongate conductors 16 to then form the portion in which the elongate conductors 16 are covered by the elongate reinforcement rib 14. As discussed, this process may alternate to form alternating portions in which the elongate conductors 16 are covered by the elongate reinforcement rib 14 and portions in which the elongate conductors 16 are uncovered by the elongate reinforcement rib 14. The alternation may occur "on-the-fly," and automatically, to continually create the covered and uncovered portions without an interruption in the operation of the mandrels or other machinery components.

A controller 90 may be utilized to control operation of the machinery shown in FIG. 12. The controller 90 may be electrically coupled to the components of the machinery, which may include the extruders 42, 50, the extrusion guide 52, the conductor guide 48, the mandrel motor 36, and the cutting mechanism 56. The controller 90 may be programmed to perform the desired operation of the machinery. The controller 90 may be programmed to operate the relocation mechanism to move one or more of the conductor guide 48 or the extrusion guide 52. The controller 90 can include a processor for executing computer-readable instructions stored in a memory of controller 90. In addition, the controller 90 can include a user interface such as a touchscreen to allow for configuration of the operation of the components of the machinery including the extruders 42, 50, the extrusion guide 52, the conductor guide 48, the mandrel motor 36, and the cutting mechanism 56. In other examples, separate controllers may control these components.

The controller 90 may be configured to control a length of the portion in which the elongate conductors 16 are uncovered by the elongate reinforcement rib 14. The controller 90 may be programmed with a duration, via a timer or the like, which may be adjustable and may set a duration in which one or more of the conductor guide 48 or the extrusion guide 52 are moved to offset the elongate reinforcement rib 14 from the elongate conductors 16. After completion of the timer, the controller 90 may move one or more of the conductor guide 48 or the extrusion guide 52 to realign the elongate reinforcement rib 14 with the elongate conductors 16. Further, the controller 90 may be configured to control a timing at which the tubing 10 is cut by the cutting mechanism 56. The controller 90 may be configured to set an overall length of the tubing 10, as well as a length of the portion in which the elongate conductors 16 are covered by the elongate reinforcement rib 14 and portions in which the elongate conductors 16 are uncovered by the elongate reinforcement rib 14. In examples, the controller 90 may utilize a counter to determine the number of rotations of the mandrels to determine a time at which to cut the tubing and the movement of the conductor guide 48 or the extrusion guide 52 to offset the elongate reinforcement rib 14 from the elongate conductors 16 and realign the rib 14 and the conductors 16.

After the tubing 10 is cut, finishing processes, for example, those shown in FIGS. 10C and 10D, and 11C and 11D may be performed to the tubing 10.

The conductor receiving portion 12b may be configured as shown in FIG. 4, with ribs 30 each having a flattened top surface 32 and flattened side surfaces 34. The portion of the conductor receiving portion 12b between the ribs 30 may have a concave shape that defines the shape of the bottom of the channels 28. However, in other examples, the conductor receiving portion 12b may have a variety of other forms as desired.

FIG. 13, for example, illustrates an example of a conductor receiving portion 92 including at least one rib 94 having a convex surface separating the plurality of channels 96 each configured to receive an elongate conductor 16. The at least one rib 94 is positioned between the plurality of channels 96.

The example as shown includes four ribs 94, each having a convex surface, and three channels 96, which may have a concave surface and shape. However, in other examples a greater or lesser number of ribs 94 and channels 96 may be utilized as desired. The convex surface of the rib 94 may comprise a side surface 98, or a top surface 100, which are both in contrast to an example shown in FIG. 4 that includes flattened top surfaces 32 and side surfaces 34. At least one rib may have a side surface 98 having the convex shape and a top surface 100 having a convex shape in examples. Each of the ribs 94 may have the same shape or a different shape as desired.

The ribs 94 and channels 96 may have an undulating shape, which may comprise a repeating pattern across the ribs 94 and channels 96. For example, each rib 94 may have a convex shape and each channel 96 may have a concave shape. The convex shape of each rib 94 may match the concave shape of each channel 96. The ribs 94 and channels 96 together may form a sinusoidal shape, although other configurations may be provided. For example, the ribs 94 and channels 96 may each may have a circular shape, or another shape as desired.

The height of each rib 94 may be at or greater than a thickness of the conductors 16 positioned within the channels 96. In other examples, however, the height of each rib 94 may be lesser than a thickness of the conductors 16. Similar to the example shown in FIG. 4, the conductor receiving portion 92 may comprise an elevated portion of an extruded elongate thermoplastic ribbon 102, and may be a thick portion positioned adjacent to a thin portion 104 of the ribbon 102.

FIG. 14 illustrates an extrusion die 106 that is shaped to result in the shape of the elongate thermoplastic ribbon 102 shown in FIG. 13. For example, the extrusion die may have a shape that includes the channels 96 and rib 94 of the conductor receiving portion 92 of the tubing wall. The extrusion die 106 may be utilized with the extruder 42 shown in FIG. 6, for example. The conductor receiving portion 92 may be formed having the shape shown in FIG. 13.

The conductor receiving portion 92 may include a plurality of ribs 94 each having a convex surface, with a first channel of the plurality of channels 96 being positioned between a first rib of the plurality of ribs 94 and a second rib of the plurality of ribs 94, and a second channel of the plurality of channels 96 being positioned between the second rib and a third rib of the plurality of ribs 94, the first channel and second channel each having a convex surface. A third channel of the plurality of channels 96 may be positioned between a third rib and a fourth rib of the plurality of ribs 94, as shown in FIG. 13 for example. Various other configurations may be utilized as desired.

The conductor receiving portion 92 and corresponding extrusion die 106 may be utilized to form tubing. The shape of the ribs 94 may improve the ability of the elongate conductors 16 to be guided into the channels 96. The conductor receiving portion 92 and corresponding extrusion die 106 may be utilized in examples to form tubing that includes or does not include the portions with exposed conductors. In an example in which the tubing includes the portions with exposed conductors, it is believed that the use of the rib 94 may aid the ability of the elongate conductors 16 to be iteratively moved in and out of alignment with the channels 96 by the conductor guide 48 to form the portions of the conductors 16 covered by the elongate reinforcement rib 14 and the portions that are not covered by the elongate reinforcement rib 14. The convex shape of the ribs 94 may improve the ability of the conductors 16 to be moved in and out of alignment with the channels 96 by reducing the possibility of one of the conductors 16 snagging on a flattened sidewall of a rib when being moved out of alignment with the channel, and by providing an improved angled surface for entry of the conductor 16 upon being moved into alignment with the channels 96. Such features are shown in FIG. 15 for example, with the conductors 16 being moved out of and into alignment with the channels 96. In other examples, other shapes of conductor receiving portions may be utilized as desired.

Figure 16A:
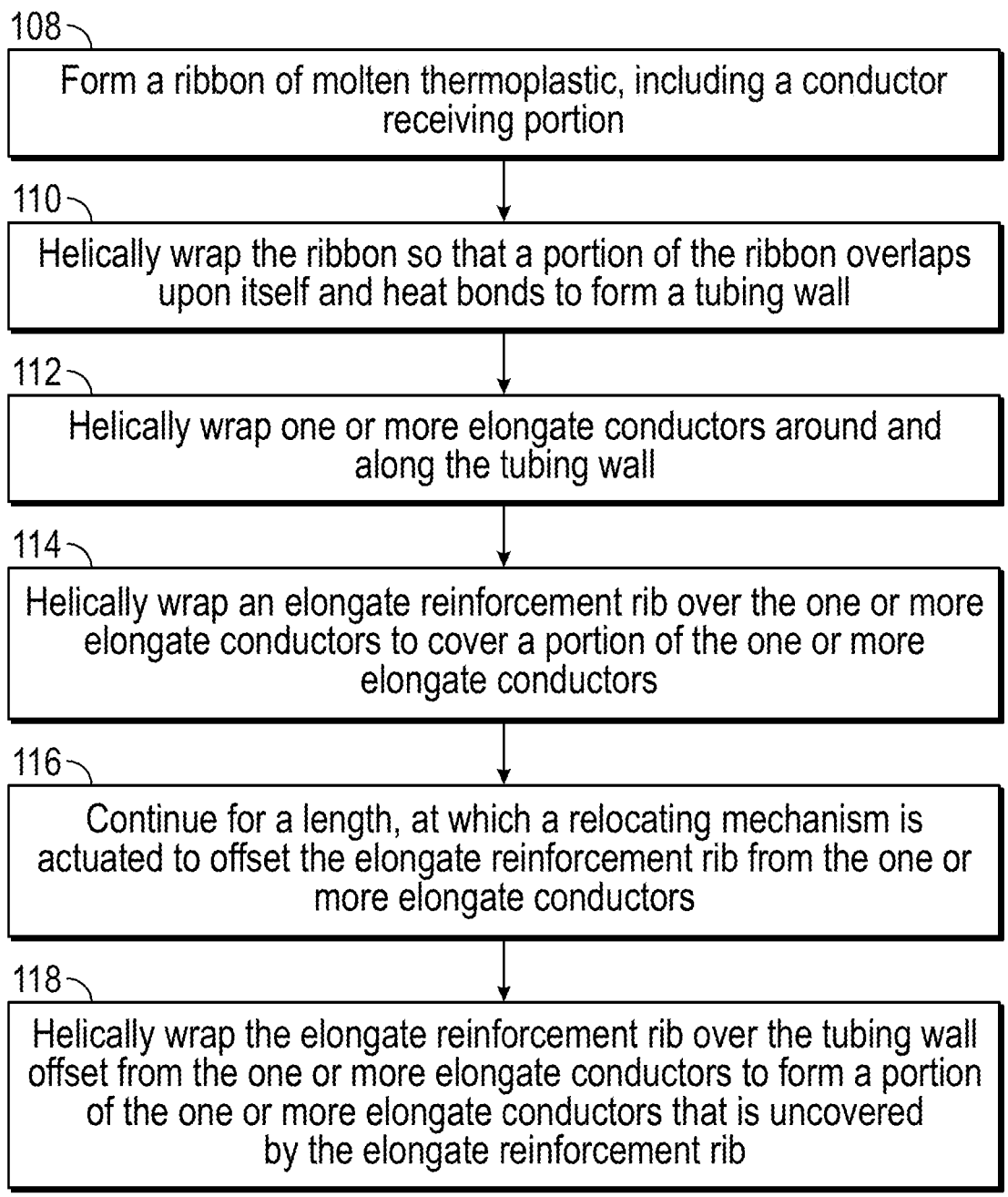
FIGS. 16A-B each disclose a method according to an example of the disclosure.
Figure 16B:
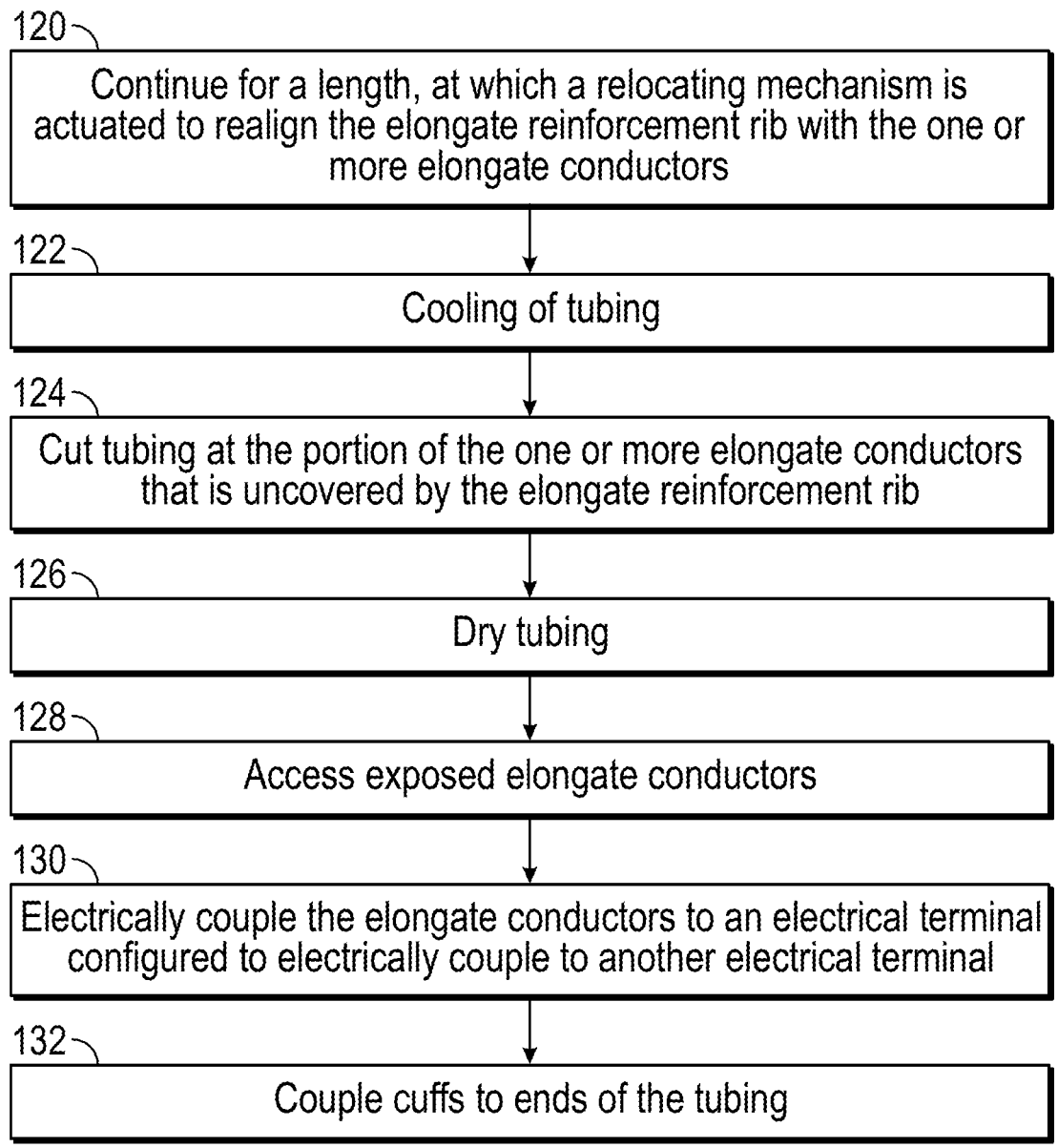

FIGS. 16A-B illustrate steps of an exemplary method of the disclosure. Steps may be modified, excluded, or added to as desired, and may incorporate or utilize apparatuses, systems, or other method or processing steps disclosed herein. Steps may be substituted with other method or processing steps disclosed herein.

In step 108, a ribbon of molten thermoplastic may be formed, which may include formation via an extrusion process as disclosed herein. A step may include forming a ribbon of molten thermoplastic. The ribbon may be extruded from an extrusion die that may comprise any of the forms of extrusion dies disclosed herein. The ribbon may include a conductor receiving portion, which may be configured similarly as the conductor receiving portions disclosed herein. The conductor receiving portion may be configured with channels for receiving the elongate conductors.

In step 110, the ribbon may be helically wrapped so that a portion of the ribbon overlaps upon itself and heat bonds to form a tubing wall. A step may include helically wrapping the ribbon so that a portion of the ribbon overlaps upon itself and heat bonds to form a tubing wall. A portion of the ribbon overlaps upon itself, forming an overlap joint, and then initially cools. Such features are disclosed in regard to FIGS. 3 and 7-9. The ribbon may be wrapped at a helix angle about the rotating mandrels as desired.

In step 112, one or more elongate conductors may be helically wrapped around and along the tubing wall. A step may include helically wrapping one or more conductors around and along the tubing wall. The elongate conductors may be positioned upon the conductor receiving portion and may be positioned within channels of the conductors receiving portion as disclosed herein. The elongate conductors may be wrapped at the helix angle, and continued cooling of the ribbon may occur.

In step 114, an elongate reinforcement rib may be formed and may be helically wrapped over the one or more elongate conductors to cover a portion of the one or more elongate conductors. A step may include helically wrapping an elongate reinforcement rib over the one or more elongate conductors to cover a first portion of the one or more elongate conductors. The elongate reinforcement rib may be extruded. The elongate reinforcement rib may be heat bonded to the conductor receiving portion and may be integral with the conductor receiving portion. The elongate conductors may be covered and encapsulated by the elongate reinforcement rib.

In step 116, the elongate conductors may continue within the channels of the conductor receiving portion for a length, at which a relocating mechanism may be actuated to offset the elongate reinforcement rib from the one or more elongate conductors. The relocation mechanism may include one or more of the conductor guide 48 or the extrusion guide 52 being moved to move the position that the respective elongate conductors 16 or elongate reinforcement rib 14, or both, are helically wrapped around the tubing wall 12. Such movement may result in an offset of the elongate reinforcement rib from the one or more elongate conductors as disclosed herein. The respective elongate conductors 16 or elongate reinforcement rib 14, or both, may be moved away from the receiving portion, and may be helically wrapped over a relatively thin portion of the tubing wall adjacent to the receiving portion.

In step 118, the elongate reinforcement rib may be helically wrapped over the tubing wall offset from the one or more elongate conductors to form a portion of the one or more elongate conductors that is uncovered by the elongate reinforcement rib. Such a configuration is shown in the middle portions of FIGS. 7-9, for example.

Referring to FIG. 16B, which is a continuation of FIG. 16A, in step 120 the elongate reinforcement rib may be helically wrapped over the tubing wall offset from the one or more elongate conductors for a length. The relocating mechanism may then be actuated to realign the elongate reinforcement rib with the one or more elongate conductors, to form a portion of the one or more elongate conductors that is covered by the elongate reinforcement rib. For example, one or more of the conductor guide 48 or the extrusion guide 52 may be moved such that the elongate reinforcement rib is positioned over the elongate conductors 16.

In step 122, the tubing may be cooled utilizing methods disclosed herein or other methods as desired.

In step 124, the tubing may be cut at the portion of the one or more elongate conductors that is uncovered by the elongate reinforcement rib. Such cutting is shown in FIG. 12 and is referenced in regard to FIGS. 10B and 11B. Cutting may form an end of the tubing wall having the one or more elongate conductors that are uncovered by the elongate reinforcement rib. In step 126, the tubing may be dried.

In step 128, the exposed elongate conductors that are uncovered by the elongate reinforcement rib may be accessed. Such access may include manually removing the exposed elongate conductors from the outer surface of the tubing wall or via another method. The one or more elongate conductors may be removed from the tubing wall at the second portion of the tubing wall.

In step 130, the exposed elongate conductors may be electrically coupled to an electrical terminal that is configured to electrically couple to another electrical terminal (such as a second electrical terminal). Such an electrical terminal may comprise an electrical terminal 78 as shown in FIGS. 10C and 10D, or electrical terminals 78a, 78b shown in FIGS. 11C, 11D or another form of electrical terminal. In step 132, cuffs may be coupled to the ends of the tubing. The cuffs may have a form as shown in FIG. 10D or 11D, or may comprise another form of cuff. A single cuff may be coupled to an end of the tubing or multiple cuffs (e.g., a first and a second cuff) may be coupled to a first end and a second or opposite end of the tubing.

The methods disclosed herein may utilize the conductor receiving portion shown in FIG. 13 and the die shown in FIG. 14 as desired. For example, the method may include forming a ribbon of molten thermoplastic having a conductor receiving portion that is formed with at least one rib having a convex surface and a plurality of channels each configured to receive an elongate conductor. The method may include helically wrapping the ribbon so that a portion of the ribbon overlaps upon itself and heat bonds to form a tubing wall. The method may include helically wrapping a plurality of elongate conductors within the plurality of channels. The method may include helically wrapping an elongate reinforcement rib over the plurality of elongate conductors to cover the plurality of elongate conductors. The method may include helically wrapping the elongate reinforcement rib over the tubing wall offset from the plurality of elongate conductors to form a first portion of the plurality of elongate conductors that is uncovered by the elongate reinforcement rib.

In addition, the methods herein are not limited to the methods specifically described, and may include methods of manufacturing or utilizing the systems and apparatuses disclosed herein. The steps of the methods may be modified, excluded, or added to, with systems, apparatuses, and methods disclosed herein.

FIG. 17 illustrates formation of a tubing in which the tubing wall 140 is formed of an elongate thermoplastic ribbon 142 that is helically wrapped and heat bonded to itself to form the tubing wall 140. One or more elongate conductors 16 are helically wrapped around and along the tubing wall 140. An elongate reinforcement rib 144 is helically wrapped around and along the tubing wall 140 such that the tubing wall 140 includes a first portion 145 in which the elongate reinforcement rib 144 is bonded to the tubing wall 140 and a second portion 147 in which the elongate reinforcement rib 144 has a reduced bonding to the tubing wall 140 relative to the first portion 145. In the first portion 145 and the second portion 147, the elongate reinforcement rib 144 may cover the one or more elongate conductors 16.

The formation of such tubing may occur according to the steps shown in FIG. 17. In the rightmost portion of FIG. 17, the elongate conductors 16 are positioned within the channels 146 of the conductor receiving portion 149 of the tubing wall 140 in a similar manner as disclosed herein.

In the first from rightmost portion of FIG. 17, a process may be performed to produce a reduced bonding between the elongate reinforcement rib 144 and the tubing wall 140. Such a process may have a variety of forms. In examples, a substance 148 may be introduced between the elongate reinforcement rib 144 and the tubing wall 140 to reduce the bonding of the elongate reinforcement rib 144 to the tubing wall 140 at the second portion 147. In examples, the substance 148 may comprise an adhesion reducing chemical, a gas, or water that may reduce the bonding. For example, an adhesion reducing chemical may comprise a liquid or a solid, or a combination thereof (e.g., a mist, such as a sprayed powder), and may be in the form of isopropyl alcohol, silicone spray, or a polytetrafluoroethylene (PTFE, such as Teflon) spray, or other form of adhesion reducing chemical. The adhesion reducing chemical may be introduced upon one or more of the contact surfaces 150a, 150b of the elongate reinforcement rib 144 or the tubing wall 140. In examples, the substance may comprise a gas, such as air or another form of gas. The gas may comprise a supercooled air or another form of gas as desired.

An introducer assembly 152 such as a nozzle, or atomizer, or other form of introducer assembly 152 may be utilized to introduce the substance between the contact surfaces 150a, 150b. With the presence of the substance, such as water, a gas, or an adhesion reducing chemical upon one or more of the contact surfaces 150a, 150b, the elongate reinforcement rib 144 may have a reduced bonding to the tubing wall 140 relative to the first portion 145. As such, as shown in the first from leftmost portion of FIG. 17, a partial bond of the elongate reinforcement rib 144 to the tubing wall 140 may result.

In examples, the substance 148 may comprise a film such as a strip of material that is introduced between the contact surfaces 150a, 150b to reduce the bond between the elongate reinforcement rib 144 and the tubing wall 140. The strip of material may comprise a polytetrafluoroethylene (PTFE, such as Teflon) coated paper or another material.

In examples, the substance 148 may be configured to cool one or more of the contact surfaces 150a, 150b of the elongate reinforcement rib 144 or the tubing wall 140 to reduce the bonding of the elongate reinforcement rib 144 to the tubing wall 140. The substance 148, for example, may comprise water that is introduced between the contact surfaces 150a, 150b of the elongate reinforcement rib 144 and the tubing wall 140 to reduce the bonding of the elongate reinforcement rib 144 to the tubing wall 140 at the second portion 147. The water may cool one or more of the contact surfaces 150a, 150b such that the temperature of one or more of the contact surfaces 150a, 150b is reduced and the molten state of one or more of the contact surfaces 150a, 150b is reduced. As such, the bonding between the contact surfaces 150a, 150b is reduced because the contact surfaces 150a, 150b may have a reduced adhesion to each other. During formation, the introducer assembly 152 may introduce the substance such as water with a pour or spray or other manner of introduction between the contact surfaces 150a, 150b. FIG. 17 illustrates in the first from leftmost portion of FIG. 17 that a partial bonding has resulted due to the cooling of one or more of the contact surfaces 150a, 150b. In examples, a gas, such as air or another form of gas may be used to cool one or more of the contact surfaces 150a, 150b of the elongate reinforcement rib 144 or the tubing wall 140 to reduce the bonding of the elongate reinforcement rib 144 to the tubing wall 140. The introducer assembly 152 may introduce the gas. The gas may comprise a supercooled air or another form of gas as desired.

In examples, other methods may be utilized to cool one or more of the contact surfaces 150a, 150b. For example, a fan, a heat sink, a method of reducing ambient air temperature, or another method of cooling may be utilized as desired.

The rib 144 may retain a helical shape around the tubing wall 140 and the elongate conductors 16 due to the hardening of the elongate reinforcement rib 144, yet may have a partial bond to the tubing wall 140.

The portion of the tubing that has the reduced bonding may extend for a defined length of the tubing. Thus, the partial bonding may occur adjacent to the first portion 145 having the full bonding. In such a manner, a controller 90 as shown in FIG. 12 may be utilized to control the operation of the introducer assembly 152 to only produce the partial bonding for a defined length of the tubing (or defined timing) and then cease operation of the introducer assembly 152 to produce the full bonding (as shown with first portion 145) for another length of the tubing.

A controller 90 may be configured to produce the second portions 147 of the tubing such that the second portions 147 comprise ends of the tubing. A cutting mechanism 56 as shown in FIG. 12, for example, may be configured to cut the tubing at the second portion 147 such that the second portion 147 forms an end of the tubing. The first portion 145 may be positioned between the second portions 147, and the second portions 147 may be cut to form the ends of the tubing. The controller 90 may be configured to control the introducer assembly 152 and the cutting mechanism 56 to respectively form the second portions 147 and cut the tubing at the second portions 147 to form ends of the tubing.

FIG. 18 illustrates an example in which the processes discussed in regard to FIG. 17 produces a second portion 154 in which the elongate reinforcement rib 144 lacks a bond to the tubing wall 140. In such an example, a similar process as discussed in regard to FIG. 17 may result in a lack of a bond to the tubing wall 140. For example, a substance 148 may be introduced between the elongate reinforcement rib 144 and the tubing wall 140 to reduce the bonding of the elongate reinforcement rib 144 to the tubing wall 140 at the second portion 154. The substance 148, for example, may comprise water, a gas, an adhesion reducing chemical, or another substance disclosed herein. The reduced bonding, however, may comprise a lack of a bond between the elongate reinforcement rib 144 and the tubing wall 140. The elongate reinforcement rib 144 at the second portion 154 may lack a bond to the tubing wall 140. The elongate reinforcement rib 144, however, may remain positioned over the tubing wall 140 and over the elongate conductors 16 due to the hardening of the elongate reinforcement rib 144 due to cooling of the material of the rib 144. The rib 144 main retain a helical shape around the tubing wall 140 and the elongate conductors 16 due to the hardening of the elongate reinforcement rib 144, yet may lack a bond to the tubing wall 140. In examples, the rib 144 may remain flexible upon the tubing wall 140.

The tubing may include a first portion 156 that includes a full bond to the elongate reinforcement rib 144.

The second portions 147, 154 may retain the reduced bonding to the elongate reinforcement rib 144 even when the second portions 147, 154 have cooled to have a reduced temperature from a thermal bonding temperature. As such, the resulting second portions 147, 154 may be available for additional manufacturing steps with the reduced bonding to the elongate reinforcement rib 144. The elongate reinforcement rib 144 and tubing wall 140 at both the first portions 145, 156 and second portions 147, 154 may have a reduced temperature from the thermal bonding temperature.

Figure 19A:
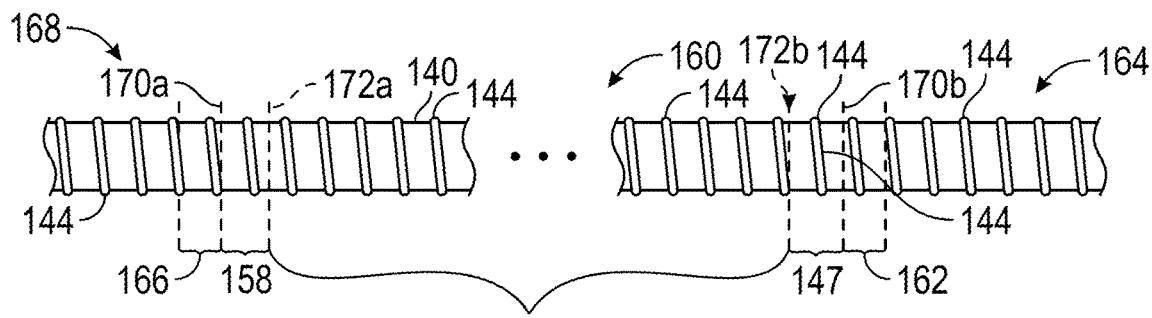
FIG. 19A provides an exterior view of tubing according to an example of the disclosure.

As discussed, the second portions 147, 154 may comprise ends of the respective tubing, and the first portions 145, 156 may comprise intermediate portions between the ends. FIG. 19A, for example, illustrates a resulting configuration of tubing 160 that may result from the process shown in FIG. 17. An intermediate or central portion of the tubing 160 may comprise the first portion 145 having a full bond to the elongate reinforcement rib 144. The first portion 145 may extend for a desired length. An adjacent portion of the tubing 160 may comprise the second portion 147 that has a reduced bonding to the tubing wall 140 relative to the first portion 145. The second portion 147 may extend for a desired length. As shown in FIG. 19A, the second portion 147 may be adjacent to another portion 162 having a reduced bonding of the rib 144 to the tubing wall 140, which may further be adjacent to another portion 164 that may have a full bond between the rib 144 and the tubing wall 140. The portions 162, 164 may comprise portions of adjacent tubing.

Referring to the left side of FIG. 19A, the tubing 160 may include a portion 158 that has a reduced bonding to the tubing wall 140 relative to the first portion 145, and may be referred to as the third portion 158. The third portion 158 may be adjacent to another portion 166 that has a reduced bonding to the tubing wall 140 relative to the first portion 145, and may be adjacent to another portion 168 that may have a full bond between the rib 144 and the tubing wall 140.

The formation of the various portions shown in FIG. 19A, may occur "on-the-fly," and automatically due to operation of a controller 90. The controller 90 may be configured to control operation of the introducer assembly 152 or other assembly that may be utilized to form the reduced bonding portions to control a size of the reduced bonding portions relative to the first portion 145.

Figure 19B:
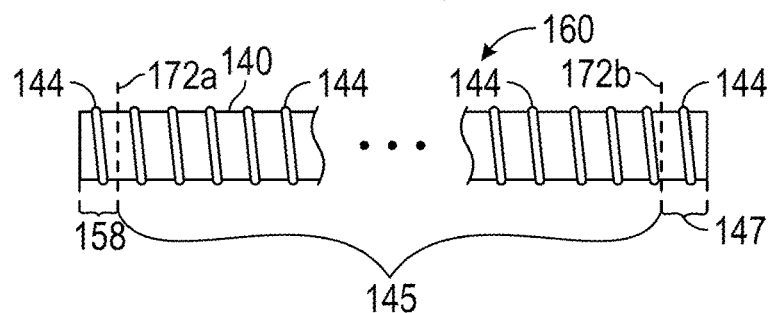
FIG. 19B provides an exterior view of the tubing of FIG. 19A having been cut according to an example of the disclosure.

Further, a controller 90 may be configured to cut the tubing 160 along cut lines 170a, b by operation of a cutting mechanism 56 as shown in FIG. 12. The resulting tubing 160 cut along cut lines 170a, b may be represented in FIG. 19B. The second portion 147 may comprise an end of the tubing wall 140 and the third portion 158 may comprise an opposite end of the tubing wall 140. The first portion 145 of the tubing wall 140 may be positioned between the second portion 147 and the third portion 158.

The second portion 147 and third portion 158 may have a reduced bonding to the tubing wall relative to the first portion 145. As such, the elongate reinforcement rib 144 at the second portion 147 and third portion 158 may be separable from the tubing wall 140. The elongate reinforcement rib 144 may be removed from the tubing wall 140 with a greater ease than at the first portion 145. The reduced bonding may allow the elongate reinforcement rib 144 to be separated from the tubing wall at the second portion 147 and the third portion 158 by being pulled from the tubing wall, or by use of a device such as a cutting device. An enhanced ease of removal may result. Manual separation may be utilized in examples.

Figure 19C:
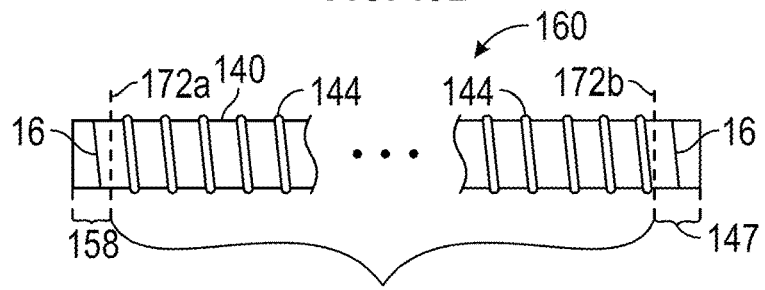
FIG. 19C provides an exterior view of the tubing of FIG. 19B with exposed conductors according to an example of the disclosure.

The elongate reinforcement rib 144 may be separated from the second portion 147 of the tubing 160 to expose the one or more elongate conductors 16. Accordingly, the conductors 16 may be more easily accessed beneath the elongate reinforcement rib 144 due to the reduced bonding at the second portion 147 and the third portion 158. FIG. 19C, for example, illustrates the elongate reinforcement rib 144 at the second portion 147 and third portion 158 having been separated from the tubing wall 140 to expose the conductors 16.

Figure 19D:
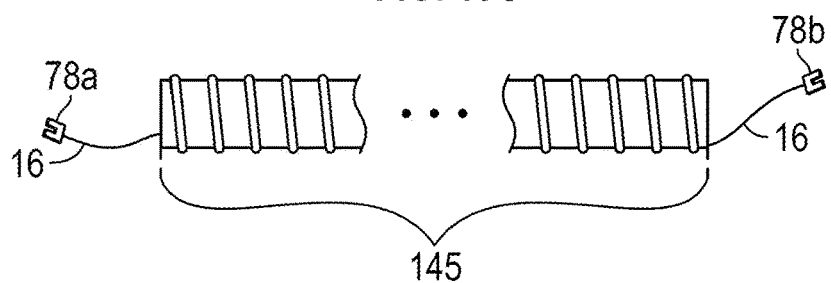
FIG. 19D provides an exterior view of the tubing of FIG. 19C having been cut according to an example of the disclosure.

In examples, cuts may be made along cut lines 172a, b to separate the second portion 147 and third portion 158 from the first portion 145 to produce the configuration shown in FIG. 19D. In examples, the tubing wall at the second portion 147 and third portion 158 may remain coupled to the first portion 145, and the cuffs 80a, b may be positioned over such portions.

As shown in FIG. 19D, the conductors 16 may be electrically coupled to the electrical terminals 78a, b.

Figure 19E:
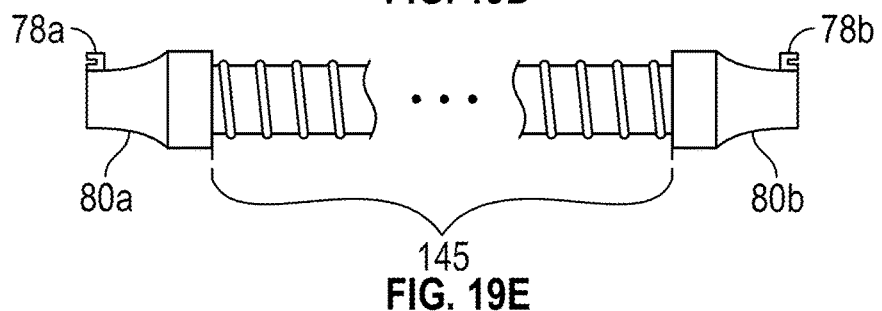
FIG. 19E provides an exterior view of the tubing of FIG. 19D having cuffs added to the ends of the tubing according to an example of the disclosure.

In FIG. 19E, the cuffs 80a, 80b may be affixed to the first portion 145, with the electrical terminals 78a, b coupled to the respective cuffs 80a, 80b.

In the examples of FIGS. 17-19E, the reduced bonding of the elongate reinforcement rib to the tubing wall may enhance the ease at which the elongate reinforcement rib is separated from the tubing wall. As such, the complexity associated with exposing the conductors 16 may be reduced, and improved manufacturing may result. Further, the ease of separating the reinforcement rib from the tubing wall may reduce the manufacturing steps as well.

The steps of FIG. 19A-E may be utilized with an example as shown in FIG. 17 in which a partial bond may exist, and may be utilized in an example as shown in FIG. 18 in which a lack of a bond may exist. Various other configurations of tubing may be utilized as desired.

A method of forming the tubing disclosed in regard to the examples of FIGS. 1-16B may be utilized with the examples of FIGS. 17-19E. For example, a method may include forming a ribbon of molten thermoplastic. The method may include helically wrapping the ribbon so that a portion of the ribbon overlaps upon itself and heat bonds to form a tubing wall. The method may include helically wrapping one or more elongate conductors around and along the tubing wall. The method may include helically wrapping an elongate reinforcement rib around and along a first portion of the tubing wall. The method may include bonding the elongate reinforcement rib to the first portion of the tubing wall. The method may include helically wrapping the elongate reinforcement rib around and along a second portion of the tubing wall. The method may include forming a reduced bond between the elongate reinforcement rib and the second portion of the tubing wall relative to the bond between the elongate reinforcement rib and the first portion of the tubing wall. The method may include cutting the tubing wall at the second portion to form an end of the tubing wall.

Examples disclosed herein may include a method including coupling a cuff to an end of tubing. The tubing may include a tubing wall formed of an elongate thermoplastic ribbon helically wrapped and heat bonded to itself to form the tubing wall, one or more elongate conductors helically wrapped around and along the tubing wall, and an elongate reinforcement rib helically wrapped around and along the tubing wall such that the tubing wall includes a first portion in which the elongate reinforcement rib is bonded to the tubing wall and a second portion formed by the elongate reinforcement rib having a reduced bonding to the tubing wall relative to the first portion.

The method may include electrically coupling the one or more elongate conductors to a first electrical terminal configured to electrically couple to a second electrical terminal. The first electrical terminal may be coupled to a cuff. The method may include separating the elongate reinforcement rib from the second portion of the tubing to expose the one or more elongate conductors. The one or more elongate conductors may be separated at the second portion from the tubing wall. The second portion may be positioned at the end of the tubing, and the tubing wall includes a third portion in which the elongate reinforcement rib is helically wrapped around and along the tubing wall and has a reduced bonding to the tubing wall relative to the first portion, and the first portion of the tubing wall is positioned between the second portion and the third portion of the tubing wall.

The cuff may be a first cuff, and the end of the tubing may be a first end of the tubing. The third portion may be positioned at a second end of the tubing, and the method may further comprise coupling a second cuff to the second end of the tubing. The method may include separating the elongate reinforcement rib from the third portion of the tubing to expose the one or more elongate conductors. The method may include electrically coupling the one or more elongate conductors to a third electrical terminal that is configured to electrically couple to a fourth electrical terminal, the third electrical terminal being coupled to the second cuff.

Various other methods, and combinations of features of methods across examples may be utilized as desired.

The features of the examples disclosed herein may be implemented independently of other components disclosed herein, or in combination with other components.

For purposes of this description, certain aspects, advantages, and novel features of the examples of this disclosure are described herein. The disclosed methods, apparatuses, and systems should not be construed as limiting in any way. Instead, the present disclosure is directed toward all novel and nonobvious features and aspects of the various disclosed examples, alone and in various combinations and sub-combinations with one another. The methods, apparatuses, and systems are not limited to any specific aspect or feature or combination thereof, nor do the disclosed examples require that any one or more specific advantages be present or problems be solved. Features, elements, or components of one example can be combined into other examples herein.

Example 1: Tubing comprising: a tubing wall formed of an elongate thermoplastic ribbon helically wrapped and heat bonded to itself to form the tubing wall; one or more elongate conductors helically wrapped around and along the tubing wall; and an elongate reinforcement rib helically wrapped around and along the tubing wall such that the tubing wall includes a first portion in which the elongate reinforcement rib covers the one or more elongate conductors and a second portion in which the one or more elongate conductors are uncovered by the elongate reinforcement rib and the elongate reinforcement rib wraps around the tubing wall.

Example 2: The tubing of any example herein, in particular Example 1, wherein the elongate reinforcement rib is heat bonded to the tubing wall at the first portion of the tubing wall and is heat bonded to the tubing wall at the second portion of the tubing wall.

Example 3: The tubing of any example herein, in particular Example 1 or Example 2, wherein the second portion of the tubing wall comprises an end of the tubing wall.

Example 4: The tubing of any example herein, in particular Example 3, wherein the elongate reinforcement rib is helically wrapped around and along the tubing wall such that the tubing wall includes a third portion in which the one or more elongate conductors are uncovered by the elongate reinforcement rib and the elongate reinforcement rib wraps around the tubing wall, and the first portion of the tubing wall is positioned between the second portion and the third portion of the tubing wall, and the third portion comprises an end of the tubing wall.

Example 5: The tubing of any example herein, in particular Examples 1-4, wherein the tubing wall includes a receiving portion helically wrapped around and along the tubing wall and configured to receive the one or more elongate conductors.

Example 6: The tubing of any example herein, in particular Example 5, wherein one or more of the elongate reinforcement rib or the one or more elongate conductors are offset from the receiving portion at the second portion of the tubing wall.

Example 7: The tubing of any example herein, in particular Example 6, wherein the receiving portion includes one or more channels for receiving the one or more elongate conductors.

Example 8: The tubing of any example herein, in particular Example 7, wherein the receiving portion is thicker than an adjacent portion of the tubing wall.

Example 9: The tubing of any example herein, in particular Example 8, wherein one or more of the elongate reinforcement rib or the one or more elongate conductors are positioned on the adjacent portion of the tubing wall at the second portion of the tubing wall.

Example 10: The tubing of any example herein, in particular Examples 5-9, wherein the receiving portion is formed with at least one rib having a convex surface.

Example 11: Tubing comprising: a tubing wall formed of an elongate thermoplastic ribbon helically wrapped and heat bonded to itself to form the tubing wall; an elongate reinforcement rib helically wrapped around and along the tubing wall; and one or more elongate conductors helically wrapped around and along the tubing wall and including a first portion covered by the elongate reinforcement rib, and a second portion being uncovered by the elongate reinforcement rib and formed by the elongate reinforcement rib while molten being wrapped offset from the one or more elongate conductors to not cover the one or more elongate conductors.

Example 12: The tubing of any example herein, in particular Example 11, wherein the tubing wall includes a first end and a second end and a central portion positioned between the first end and the second end, and the first portion of the one or more elongate conductors are positioned at the central portion of the tubing wall, and the second portion of the one or more elongate conductors are positioned at the second end of the tubing wall.

Example 13: The tubing of any example herein, in particular Example 12, further comprising: a first cuff positioned at the second end of the tubing wall and including a first electrical terminal electrically coupled to the second portion of the one or more elongate conductors and configured to electrically couple to a second electrical terminal; and a second cuff positioned at the first end of the tubing wall.

Example 14: The tubing of any example herein, in particular Example 13, wherein the second cuff includes a third electrical terminal electrically coupled to the one or more elongate conductors and configured to electrically couple to a fourth electrical terminal.

Example 15: The tubing of any example herein, in particular Example 14, wherein the one or more elongate conductors include a third portion being uncovered by the elongate reinforcement rib and formed by the elongate reinforcement rib while molten being wrapped offset from the one or more elongate conductors to not cover the one or more elongate conductors, with the first portion being positioned between the third portion and the second portion.

Example 16: The tubing of any example herein, in particular Example 15, wherein the third electrical terminal is electrically coupled to the third portion of the one or more elongate conductors.

Example 17: The tubing of any example herein, in particular Examples 11-16, wherein the tubing wall includes a receiving portion helically wrapped around and along the tubing wall and configured to receive the one or more elongate conductors.

Example 18: The tubing of any example herein, in particular Example 17, wherein the receiving portion includes one or more channels for receiving the one or more elongate conductors.

Example 19: The tubing of any example herein, in particular Example 18, wherein the receiving portion is thicker than an adjacent portion of the tubing wall.

Example 20: The tubing of any example herein, in particular Examples 17-19, wherein the receiving portion is formed with at least one rib having a convex surface.

Example 21: A method of making tubing, the method comprising: forming a ribbon of molten thermoplastic; helically wrapping the ribbon so that a portion of the ribbon overlaps upon itself and heat bonds to form a tubing wall; helically wrapping one or more elongate conductors around and along the tubing wall; helically wrapping an elongate reinforcement rib over the one or more elongate conductors to cover a first portion of the one or more elongate conductors; and helically wrapping the elongate reinforcement rib over the tubing wall offset from the one or more elongate conductors to form a second portion of the one or more elongate conductors that is uncovered by the elongate reinforcement rib.

Example 22: The method of any example herein, in particular Example 21, further comprising realigning the elongate reinforcement rib with the one or more elongate conductors to form a third portion of the one or more elongate conductors that is covered by the elongate reinforcement rib.

Example 23: The method of any example herein, in particular Example 21 or Example 22, wherein the tubing wall includes a receiving portion helically wrapped around and along the tubing wall and configured to receive the one or more elongate conductors, and the method further comprises moving one or more of the elongate reinforcement rib or the one or more elongate conductors away from the receiving portion to form the second portion of the one or more elongate conductors that is uncovered by the elongate reinforcement rib.

Example 24: The method of any example herein, in particular Example 23, wherein the receiving portion is thicker than an adjacent portion of the tubing wall and includes one or more channels for receiving the one or more elongate conductors, and the method further comprises helically wrapping one or more of the elongate reinforcement rib or the one or more elongate conductors over the adjacent portion of the tubing wall to form the second portion of the one or more elongate conductors that is uncovered by the elongate reinforcement rib.

Example 25: The method of any example herein, in particular Example 24, wherein the receiving portion includes at least one rib positioned between a plurality of the channels and being formed having a convex surface.

Example 26: The method of any example herein, in particular Examples 21-25, further comprising cutting the tubing wall at the second portion of the one or more elongate conductors to form an end of the tubing wall having the one or more elongate conductors that are uncovered by the elongate reinforcement rib.

Example 27: The method of any example herein, in particular Example 26, further comprising electrically coupling the second portion of the one or more elongate conductors to a first electrical terminal configured to electrically couple to a second electrical terminal.

Example 28: The method of any example herein, in particular Example 26 or Example 27, further comprising coupling a cuff to the end of the tubing wall.

Example 29: The method of any example herein, in particular Example 28, wherein the cuff is a first cuff and the method further comprises coupling a second cuff to an opposite end of the tubing wall.

Example 30: The method of any example herein, in particular Example 29, further comprising electrically coupling the one or more elongate conductors at the opposite end of the tubing wall to a third electrical terminal configured to electrically couple to a fourth electrical terminal.

Example 31: A method comprising: coupling a cuff to an end of tubing, the tubing including: a tubing wall formed of an elongate thermoplastic ribbon helically wrapped and heat bonded to itself to form the tubing wall, one or more elongate conductors helically wrapped around and along the tubing wall, and an elongate reinforcement rib helically wrapped around and along the tubing wall such that the tubing wall includes a first portion in which the elongate reinforcement rib covers the one or more elongate conductors and a second portion in which the one or more elongate conductors are uncovered by the elongate reinforcement rib and the elongate reinforcement rib wraps around the tubing wall, the second portion being positioned at the end of the tubing.

Example 32: The method of any example herein, in particular Example 31, further comprising electrically coupling the one or more elongate conductors to a first electrical terminal configured to electrically couple to a second electrical terminal.

Example 33: The method of any example herein, in particular Example 32, wherein the cuff is a first cuff and the method further comprises coupling a second cuff to an opposite end of the tubing wall.

Example 34: The method of any example herein, in particular Example 33, further comprising electrically coupling the one or more elongate conductors at the opposite end of the tubing wall to a third electrical terminal configured to electrically couple to a fourth electrical terminal.

Example 35: The method of any example herein, in particular Example 34, wherein the first electrical terminal is positioned on the first cuff and the third electrical terminal is positioned on the second cuff.

Example 36: The method of any example herein, in particular Examples 31-35, further comprising removing the one or more elongate conductors from the tubing wall at the second portion of the tubing wall.

Example 37: The method of any example herein, in particular Examples 31-36, wherein the tubing wall includes a receiving portion helically wrapped around and along the tubing wall and configured to receive the one or more elongate conductors.

Example 38: The method of any example herein, in particular Example 37, wherein the receiving portion includes one or more channels for receiving the one or more elongate conductors.

Example 39: The method of any example herein, in particular Example 38, wherein the receiving portion is thicker than an adjacent portion of the tubing wall.

Example 40: The method of any example herein, in particular Examples 37-39, wherein the receiving portion is formed with at least one rib having a convex surface.

Example 41: Tubing comprising: a tubing wall formed of an elongate thermoplastic ribbon having a conductor receiving portion that is formed with at least one rib having a convex surface and separating a plurality of channels each configured to receive an elongate conductor, the elongate thermoplastic ribbon being helically wrapped and heat bonded to itself to form the tubing wall; a plurality of elongate conductors helically wrapped around and along the tubing wall and each positioned within a respective one of the plurality of channels; and an elongate reinforcement rib helically wrapped around and along the tubing wall and covering the plurality of elongate conductors.

Example 42: The tubing of any example herein, in particular Example 41, wherein the conductor receiving portion includes a plurality of ribs each having a convex surface, a first channel of the plurality of channels being positioned between a first rib of the plurality of ribs and a second rib of the plurality of ribs, and a second channel of the plurality of channels being positioned between the second rib and a third rib of the plurality of ribs, the first channel and the second channel each having a convex surface.

Example 43: The tubing of any example herein, in particular Example 42, further comprising a third channel of the plurality of channels being positioned between the third rib and a fourth rib of the plurality of ribs.

Example 44: The tubing of any example herein, in particular Example 43, wherein the second rib and the third rib each have the same shape.

Example 45: The tubing of any example herein, in particular Examples 41-44, wherein the at least one rib has a side surface having the convex shape, and a top surface having a convex shape.

Example 46: The tubing of any example herein, in particular Examples 41-45, wherein the at least one rib and the plurality of channels have an undulating shape.

Example 47: The tubing of any example herein, in particular Example 46, wherein the at least one rib and the plurality of channels have a sinusoidal shape.

Example 48: The tubing of any example herein, in particular Example 46 or Example 47, wherein the at least one rib and the plurality of channels each have a circular shape.

Example 49: The tubing of any example herein, in particular Examples 41-48, wherein the least one rib has a height that is at or greater than a thickness of each of the plurality of elongate conductors.

Example 50: The tubing of any example herein, in particular Examples 41-49, wherein the conductor receiving portion is thicker than an adjacent portion of the elongate thermoplastic ribbon.

Example 51: A method of making tubing, the method comprising: forming a ribbon of molten thermoplastic having a conductor receiving portion that is formed with at least one rib having a convex surface and separating a plurality of channels each configured to receive an elongate conductor; helically wrapping the ribbon so that a portion of the ribbon overlaps upon itself and heat bonds to form a tubing wall; helically wrapping a plurality of elongate conductors within the plurality of channels; and helically wrapping an elongate reinforcement rib over the plurality of elongate conductors to cover the plurality of elongate conductors.

Example 52: The method of any example herein, in particular Example 51, wherein the at least one rib has a side surface having the convex shape, and a top surface having a convex shape.

Example 53: The method of any example herein, in particular Example 51 or Example 52, wherein the at least one rib and the plurality of channels have an undulating shape.

Example 54: The method of any example herein, in particular Example 53, wherein the at least one rib and the plurality of channels have a sinusoidal shape.

Example 55: The method of any example herein, in particular Example 53 or Example 54, wherein the at least one rib and the plurality of channels each have a circular shape.

Example 56: The method of any example herein, in particular Examples 51-54, further comprising helically wrapping the elongate reinforcement rib over the tubing wall offset from the plurality of elongate conductors to form a first portion of the plurality of elongate conductors that is uncovered by the elongate reinforcement rib.

Example 57: The method of any example herein, in particular Example 56, further comprising realigning the elongate reinforcement rib with the plurality of elongate conductors to form a second portion of the plurality of elongate conductors that is covered by the elongate reinforcement rib.

Example 58: The method of any example herein, in particular Example 57, further comprising cutting the tubing wall at the first portion of the plurality of elongate conductors to form an end of the tubing wall having the plurality of elongate conductors that are uncovered by the elongate reinforcement rib.

Example 59: The method of any example herein, in particular Example 58, further comprising coupling a cuff to the end of the tubing wall.

Example 60: The method of any example herein, in particular Examples 56-59, further comprising electrically coupling the first portion of the plurality of elongate conductors to a first electrical terminal configured to electrically couple to a second electrical terminal.

Example 61: Tubing comprising: a tubing wall formed of an elongate thermoplastic ribbon helically wrapped and heat bonded to itself to form the tubing wall; one or more elongate conductors helically wrapped around and along the tubing wall; and an elongate reinforcement rib helically wrapped around and along the tubing wall such that the tubing wall includes a first portion in which the elongate reinforcement rib is bonded to the tubing wall and a second portion in which the elongate reinforcement rib has a reduced bonding to the tubing wall relative to the first portion.

Example 62: The tubing of any example herein, in particular Example 61, wherein the second portion of the tubing wall comprises an end of the tubing wall.

Example 63: The tubing of any example herein, in particular Example 62, wherein the elongate reinforcement rib is helically wrapped around and along the tubing wall such that the tubing wall includes a third portion in which the elongate reinforcement rib has a reduced bonding to the tubing wall relative to the first portion, and the first portion of the tubing wall is positioned between the second portion and the third portion of the tubing wall, and the third portion comprises an end of the tubing wall.

Example 64: The tubing of any example herein, in particular Examples 61-63, wherein the elongate reinforcement rib at the first portion covers the one or more elongate conductors and the elongate reinforcement rib at the second portion covers the one or more elongate conductors.

Example 65: The tubing of any example herein, in particular Examples 61-64, wherein the elongate reinforcement rib at the second portion has a partial bond to the tubing wall.

Example 66: The tubing of any example herein, in particular Examples 61-65, wherein the elongate reinforcement rib at the second portion lacks a bond to the tubing wall.

Example 67: The tubing of any example herein, in particular Example 66, wherein the elongate reinforcement rib at the second portion has a reduced temperature from a thermal bonding temperature.

Example 68: The tubing of any example herein, in particular Example 67, wherein the elongate reinforcement rib at the second portion has a helical shape.

Example 69: The tubing of any example herein, in particular Examples 61-68, wherein the elongate reinforcement rib at the second portion is separable from the tubing wall.

Example 70: The tubing of any example herein, in particular Examples 61-69, wherein the elongate reinforcement rib and the tubing wall at both the first portion and the second portion have a reduced temperature from a thermal bonding temperature.

Example 71: Tubing comprising: a tubing wall formed of an elongate thermoplastic ribbon helically wrapped and heat bonded to itself to form the tubing wall; one or more elongate conductors helically wrapped around and along the tubing wall; and an elongate reinforcement rib helically wrapped around and along the tubing wall such that the tubing wall includes a first portion in which the elongate reinforcement rib is bonded to the tubing wall and a second portion formed by the elongate reinforcement rib having a reduced bonding to the tubing wall relative to the first portion.

Example 72: The tubing of any example herein, in particular Example 71, wherein the elongate reinforcement rib at the first portion covers the one or more elongate conductors and the elongate reinforcement rib at the second portion covers the one or more elongate conductors.

Example 73: The tubing of any example herein, in particular Example 71 or Example 72, wherein the elongate reinforcement rib at the second portion has a partial bond to the tubing wall.

Example 74: The tubing of any example herein, in particular Examples 71-73, wherein the elongate reinforcement rib at the second portion lacks a bond to the tubing wall.

Example 75: The tubing of any example herein, in particular Examples 71-74, wherein a substance is introduced between the elongate reinforcement rib and the tubing wall to reduce the bonding of the elongate reinforcement rib to the tubing wall at the second portion.

Example 76: The tubing of any example herein, in particular Example 75, wherein the substance comprises one or more of water, a gas, or an adhesion reducing chemical.

Example 77: The tubing of any example herein, in particular Example 75 or Example 76, wherein the substance is configured to cool a contact surface of one or more of the tubing wall or the elongate reinforcement rib.

Example 78: The tubing of any example herein, in particular Examples 71-77, wherein water or a gas is introduced between the elongate reinforcement rib and the tubing wall to reduce the bonding of the elongate reinforcement rib to the tubing wall at the second portion.

Example 79: The tubing of any example herein, in particular Examples 71-78, wherein the tubing wall is cut at the second portion.

Example 80: The tubing of any example herein, in particular Examples 71-79, wherein the elongate reinforcement rib is helically wrapped around and along the tubing wall such that the tubing wall includes a third portion in which the elongate reinforcement rib has a reduced bonding to the tubing wall relative to the first portion, and the first portion of the tubing wall is positioned between the second portion and the third portion of the tubing wall, and the third portion comprises an end of the tubing wall.

Example 81: A method of making tubing, the method comprising: forming a ribbon of molten thermoplastic; helically wrapping the ribbon so that a portion of the ribbon overlaps upon itself and heat bonds to form a tubing wall; helically wrapping one or more elongate conductors around and along the tubing wall; helically wrapping an elongate reinforcement rib around and along a first portion of the tubing wall; bonding the elongate reinforcement rib to the first portion of the tubing wall; helically wrapping the elongate reinforcement rib around and along a second portion of the tubing wall; and forming a reduced bond between the elongate reinforcement rib and the second portion of the tubing wall relative to the bond between the elongate reinforcement rib and the first portion of the tubing wall.

Example 82: The method of any example herein, in particular Example 81, wherein the elongate reinforcement rib at the first portion covers the one or more elongate conductors and the elongate reinforcement rib at the second portion covers the one or more elongate conductors.

Example 83: The method of any example herein, in particular Example 81 or Example 82, further comprising cutting the tubing wall at the second portion to form an end of the tubing wall.

Example 84: The method of any example herein, in particular Example 83, wherein the tubing wall includes a third portion in which the elongate reinforcement rib is helically wrapped around and along the tubing wall and has a reduced bonding to the tubing wall relative to the first portion, and the first portion of the tubing wall is positioned between the second portion and the third portion of the tubing wall, and the third portion comprises an end of the tubing wall.

Example 85: The method of any example herein, in particular Examples 81-84, wherein the elongate reinforcement rib at the second portion has a partial bond to the tubing wall.

Example 86: The method of any example herein, in particular Examples 81-85, wherein the elongate reinforcement rib at the second portion lacks a bond to the tubing wall.

Example 87: The method of any example herein, in particular Examples 81-86, further comprising cooling a contact surface of one or more of the tubing wall or the elongate reinforcement rib.

Example 88: The method of any example herein, in particular Examples 81-87, further comprising introducing a substance between the elongate reinforcement rib and the tubing wall to reduce the bonding of the elongate reinforcement rib to the tubing wall at the second portion.

Example 89: The method of any example herein, in particular Example 88, wherein the substance comprises one or more of water, a gas, or an adhesion reducing chemical.

Example 90: The method of any example herein, in particular Example 88 or Example 89, further comprising cooling a contact surface of one or more of the tubing wall or the elongate reinforcement rib with the substance.

Example 91: A method comprising: coupling a cuff to an end of tubing, the tubing including: a tubing wall formed of an elongate thermoplastic ribbon helically wrapped and heat bonded to itself to form the tubing wall, one or more elongate conductors helically wrapped around and along the tubing wall, and an elongate reinforcement rib helically wrapped around and along the tubing wall such that the tubing wall includes a first portion in which the elongate reinforcement rib is bonded to the tubing wall and a second portion formed by the elongate reinforcement rib having a reduced bonding to the tubing wall relative to the first portion.

Example 92: The method of any example herein, in particular Example 91, further comprising electrically coupling the one or more elongate conductors to a first electrical terminal configured to electrically couple to a second electrical terminal.

Example 93: The method of any example herein, in particular Example 92, wherein the first electrical terminal is coupled to the cuff.

Example 94: The method of any example herein, in particular Examples 91-93, wherein the elongate reinforcement rib at the first portion covers the one or more elongate conductors and the elongate reinforcement rib at the second portion covers the one or more elongate conductors.

Example 95: The method of any example herein, in particular Examples 91-94, further comprising separating the elongate reinforcement rib from the second portion of the tubing to expose the one or more elongate conductors.

Example 96: The method of any example herein, in particular Examples 91-95, further comprising separating the one or more elongate conductors at the second portion from the tubing wall.

Example 97: The method of any example herein, in particular Examples 91-96, wherein the second portion is positioned at the end of the tubing, and the tubing wall includes a third portion in which the elongate reinforcement rib is helically wrapped around and along the tubing wall and has a reduced bonding to the tubing wall relative to the first portion, and the first portion of the tubing wall is positioned between the second portion and the third portion of the tubing wall.

Example 98: The method of any example herein, in particular Example 97, wherein the cuff is a first cuff, and the end is a first end of the tubing, and the third portion is positioned at a second end of the tubing, and the method further comprises coupling a second cuff to the second end of the tubing.

Example 99: The method of any example herein, in particular Example 98, further comprising separating the elongate reinforcement rib from the third portion of the tubing to expose the one or more elongate conductors.

Example 100: The method of any example herein, in particular Example 99, further comprising electrically coupling the one or more elongate conductors to a third electrical terminal configured to electrically couple to a fourth electrical terminal, the third electrical terminal is coupled to the second cuff.

Any of the features of any of the examples, including but not limited to any of the first through 100 examples referred to above, is applicable to all other aspects and examples identified herein, including but not limited to any examples of any of the first through 100 examples referred to above. Moreover, any of the features of an example of the various examples, including but not limited to any examples of any of the first through 100 examples referred to above, is independently combinable, partly or wholly with other examples described herein in any way, e.g., one, two, or three or more examples may be combinable in whole or in part. Further, any of the features of the various examples, including but not limited to any examples of any of the first through 100 examples referred to above, may be made optional to other examples. Any example of a method can be performed by a system or apparatus of another example, and any aspect or example of a system or apparatus can be configured to perform a method of another aspect or example, including but not limited to any examples of any of the first through 100 examples referred to above.

In closing, it is to be understood that although aspects of the present specification are highlighted by referring to specific examples, one skilled in the art will readily appreciate that these disclosed examples are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular examples only, and is not intended to limit the scope of systems, apparatuses, and methods as disclosed herein, which is defined solely by the claims. Accordingly, the systems, apparatuses, and methods are not limited to that precisely as shown and described.

Certain examples of systems, apparatuses, and methods are described herein, including the best mode known to the inventors for carrying out the same. Of course, variations on these described examples will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described examples in all possible variations thereof is encompassed by the systems, apparatuses, and methods unless otherwise indicated herein or otherwise clearly contradicted by context.

Groupings of alternative examples, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses an approximation that may vary, yet is capable of performing the desired operation or process discussed herein.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems, apparatuses, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. Tubing comprising:
    a tubing wall having a length and formed of an elongate thermoplastic ribbon continuously helically wrapped and heat bonded to itself to form the tubing wall;
    one or more elongate conductors helically wrapped around and along the tubing wall; and
    an elongate reinforcement rib continuously helically wrapped around and along the tubing wall such that the tubing wall includes a first portion in which the elongate reinforcement rib covers the one or more elongate conductors and a second portion in which the one or more elongate conductors are uncovered by the elongate reinforcement rib and the elongate reinforcement rib wraps around the tubing wall, the first portion being adjacent to the second portion along the length of the tubing wall.

2. The tubing of claim 1, wherein the elongate reinforcement rib is heat bonded to the tubing wall at the first portion of the tubing wall and is heat bonded to the tubing wall at the second portion of the tubing wall.

3. The tubing of claim 1, wherein the second portion of the tubing wall comprises an end of the tubing wall.

4. The tubing of claim 3, wherein the elongate reinforcement rib is helically wrapped around and along the tubing wall such that the tubing wall includes a third portion in which the one or more elongate conductors are uncovered by the elongate reinforcement rib and the elongate reinforcement rib wraps around the tubing wall, and the first portion of the tubing wall is positioned between the second portion and the third portion of the tubing wall, and the third portion comprises an end of the tubing wall.

5. The tubing of claim 1, wherein the tubing wall includes a receiving portion helically wrapped around and along the tubing wall and configured to receive the one or more elongate conductors.

6. The tubing of claim 5, wherein one or more of the elongate reinforcement rib or the one or more elongate conductors are offset from the receiving portion at the second portion of the tubing wall.

7. The tubing of claim 6, wherein the receiving portion includes one or more channels for receiving the one or more elongate conductors.

8. The tubing of claim 7, wherein the receiving portion is thicker than an adjacent portion of the tubing wall.

9. The tubing of claim 8, wherein one or more of the elongate reinforcement rib or the one or more elongate conductors are positioned on the adjacent portion of the tubing wall at the second portion of the tubing wall.

10. The tubing of claim 5, wherein the receiving portion is formed with at least one rib having a convex surface.

11. Tubing comprising:
a tubing wall having a length and formed of an elongate thermoplastic ribbon continuously helically wrapped and heat bonded to itself to form the tubing wall;
one or more elongate conductors helically wrapped around and along the tubing wall; and
an elongate reinforcement rib continuously helically wrapped around and along the tubing wall such that the tubing wall includes a first portion in which the elongate reinforcement rib is bonded to the tubing wall and a second portion formed by the elongate reinforcement rib having a reduced bonding to the tubing wall relative to the first portion, the first portion being adjacent to the second portion along the length of the tubing wall.

12. The tubing of claim 11, wherein the elongate reinforcement rib at the first portion covers the one or more elongate conductors and the elongate reinforcement rib at the second portion covers the one or more elongate conductors.

13. The tubing of claim 11, wherein the elongate reinforcement rib at the second portion has a partial bond to the tubing wall.

14. The tubing of claim 11, wherein the elongate reinforcement rib at the second portion lacks a bond to the tubing wall.

15. The tubing of claim 11, wherein a substance is introduced between the elongate reinforcement rib and the tubing wall to reduce the bonding of the elongate reinforcement rib to the tubing wall at the second portion.

16. The tubing of claim 15, wherein the substance comprises one or more of water, a gas, or an adhesion reducing chemical.

17. The tubing of claim 15, wherein the substance is configured to cool a contact surface of one or more of the tubing wall or the elongate reinforcement rib.

18. The tubing of claim 11, wherein water or a gas is introduced between the elongate reinforcement rib and the tubing wall to reduce the bonding of the elongate reinforcement rib to the tubing wall at the second portion.

19. The tubing of claim 11, wherein the tubing wall is cut at the second portion.

20. The tubing of claim 11, wherein the elongate reinforcement rib is helically wrapped around and along the tubing wall such that the tubing wall includes a third portion in which the elongate reinforcement rib has a reduced bonding to the tubing wall relative to the first portion, and the first portion of the tubing wall is positioned between the second portion and the third portion of the tubing wall, and the third portion comprises an end of the tubing wall.

\* \* \* \* \*